(12) United States Patent
Zavatone et al.

(10) Patent No.: US 8,374,448 B2
(45) Date of Patent: Feb. 12, 2013

(54) IMAGE DATA OPTIMIZATION SYSTEMS AND METHODS

(75) Inventors: Alex Zavatone, Irving, TX (US); Donald H. Relyea, Dallas, TX (US)

(73) Assignee: Verizon Patent and Licensing, Inc., Basking Ridge, NJ (US)

( * ) Notice: Subject to any disclaimer, the term of this patent is extended or adjusted under 35 U.S.C. 154(b) by 225 days.

(21) Appl. No.: 12/983,101

(22) Filed: Dec. 31, 2010

(65) Prior Publication Data
US 2012/0170860 A1 Jul. 5, 2012

(51) Int. Cl.
*G06K 9/46* (2006.01)
(52) U.S. Cl. ............ 382/244; 382/232; 382/274
(58) Field of Classification Search ......... 382/232.244, 382/167, 274; 340/907, 909; 356/252; 326/38, 326/39; 408/13, 16; 600/437, 441; 700/50; 703/13; 782/19; 709/206, 220; 977/940
See application file for complete search history.

(56) References Cited

U.S. PATENT DOCUMENTS

| 6,339,383 | B1 * | 1/2002 | Kobayashi et al. | 340/907 |
| 7,627,386 | B2 * | 12/2009 | Mo et al. | 700/50 |

\* cited by examiner

*Primary Examiner* — Anh Hong Do

(57) ABSTRACT

An exemplary method includes an image data optimization control subsystem subjecting data representative of an image to an image data optimization cycle and repeating the subjecting of data representative of the image to the image data optimization cycle in response to a determination that output data representative of the image produced in conjunction with the previous subjection is optimized by at least the predetermined optimization threshold, wherein the repeat subjection of data representative of the image includes submitting the output data from the previous subjection as new input to the image data optimization cycle. Corresponding systems and methods are also disclosed.

24 Claims, 13 Drawing Sheets

IMAGE DATA OPTIMIZATION SYSTEMS AND METHODS

BACKGROUND INFORMATION

Advances in computing technologies have led to a proliferation of digital images in modern society. Digital images may include graphics included in graphical user interfaces, photographs, and any other digitally represented images. Such digital images are typically stored as image data (e.g., as one or more image files) in computer memory systems.

For computing systems that store significant amounts of data and/or have limited memory resources, the amount of memory resources occupied by image data may be an important concern. To help minimize the amount of memory resources needed for storing image data, tools designed to process and reduce the amount of image data used to represent digital images have been developed. Such tools are generally capable of reducing the size of image data and, consequently, the memory footprint of the image data. For example, a conventional tool typically processes an image data file using a brute force, multi-iteration routine that may produce a resulting image data file that is smaller in size than the beginning image data file. However, such a routine is typically a time consuming process, and a tool implementing such a routine often fails to produce an image data file that cannot be further optimized (e.g., the image data file is not as small as possible). In addition, for a conventional tool that uses a brute force, multi-iteration routine to optimize image data, an operator of the tool commonly experiences difficulties and/or inefficiencies in attempting to balance the number of iterations with diminishing returns in optimization results.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Exemplary image data optimization systems and methods are described herein. The exemplary image data optimization systems and methods may provide for optimization of image data in ways that balance a number of iterations with diminishing returns in optimization results. Additionally or alternatively, the exemplary image data optimization systems and methods may produce image data that cannot be further optimized while continuing to maintain the integrity of the image represented by the image data. In certain embodiments, for example, the exemplary image data optimization systems and methods may produce image data (e.g., an output image data file) that is as small as possible while still being lossless.

As described herein, in certain examples, the exemplary image data optimization systems and methods may be part of or otherwise implemented in or called by automated graphical user interface ("GUI") design and development systems and processes. Accordingly, the image data optimization systems and methods may produce optimized image data for use by the automated GUI design and development systems and processes.

As used herein, the term "image data" may refer generally to any data that represents an image such as a GUI graphic (e.g., a graphical element within a GUI), a collection of GUI graphics, a digital photograph, and the like. For example, image data may include one or more image data files, such as, but not limited to, one or more bitmap graphics files, vector graphics files, Portable Network Graphics ("PNG") files, Joint Photographic Experts Group ("JPEG") files, Tagged Image File Format ("TIFF") files, Graphics Interchange Format ("GIF") files, and any other files of a format for representing images. An image data file may include any data representative of or otherwise associated with an image. For example, a PNG file may include internal image data representing an actual image, gamma data configured for use to adjust a color display, metadata descriptive of the image, color space data, and color palette data.

As used herein, the term "optimization" may refer to any optimization of image data, including a reduction in size (e.g., a reduction in bit count) of image data representative of an image. A reduction in size of image data may be lossless or lossy. In certain embodiments, for example, optimization may be lossless in that the integrity of the image is maintained, such as by not changing the actual image (e.g., an appearance of the image) when the size of the image data is reduced. Examples of ways that image data may be optimized are described herein.

Exemplary image data optimization systems and methods will now be described in more detail with reference to the drawings.

Figure 1:
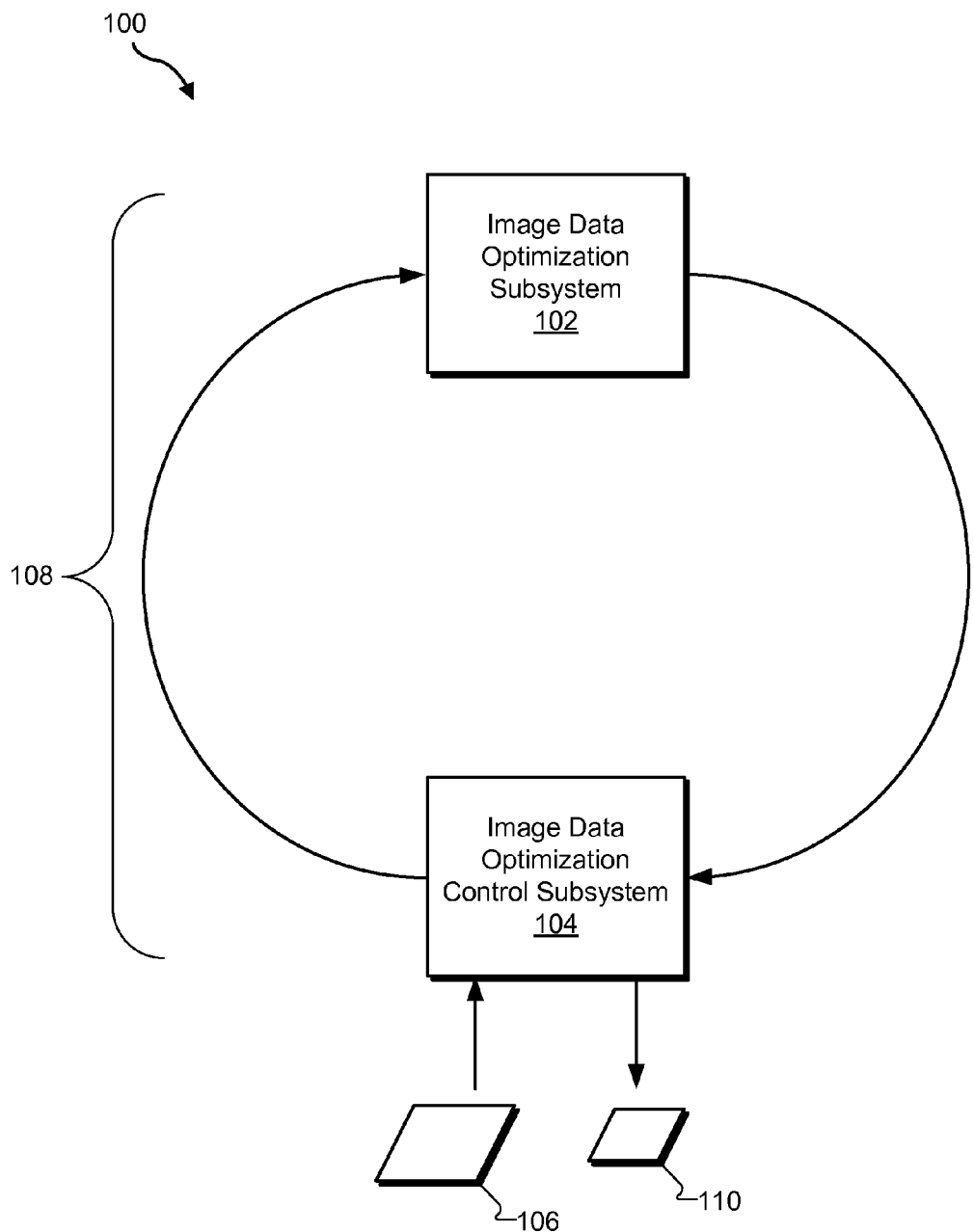
FIG. 1 illustrates an exemplary image data optimization system according to principles described herein.

FIG. 1 illustrates an exemplary image data optimization system 100 (or simply "system 100"). As shown in FIG. 1, system 100 may include an image data optimization subsystem 102 (or simply "optimization subsystem 102") and an image data optimization control subsystem 104 (or simply "control subsystem 104"), which may be configured to communicate or otherwise interface with one another using any suitable communications and/or interface technologies.

As described herein, control subsystem 104 may receive initial image data 106 representative of an image from an external source (e.g., from an automated GUI design and development system or process). Control subsystem 104 may be configured to subject the initial image data 106 (e.g., an image data file) to an image data optimization cycle 108, which may include control subsystem 104 submitting the initial image data 106 to one or more image data optimization tools within optimization subsystem 102 for optimization, receiving output image data representative of the image from the one or more image data optimization tools within optimization subsystem 102, and determining whether the output image data, as compared to the initial image data 106 submitted to optimization subsystem 102, has been optimized by at least a predetermined optimization threshold. The predetermined optimization threshold may include any value indicative of an amount of image data optimization. For example, the predetermined optimization threshold may include a predetermined amount of reduction in the bit count of image data (e.g., a predetermined number of bits or a predetermined percentage reduction in bit count from the initial image data 106 to the output image data).

A determination that the output image data has been optimized by at least the predetermined optimization threshold amount may be indicative that further optimization of data representative of the image may be attained, without comprising the integrity of the image. Hence, in response to a determination that the output image data is optimized by at least the predetermined optimization threshold, image data optimization cycle 108 may be repeated, such as by control subsystem 108 repeating the subjection of image data representative of the image to the one or more image data optimization tools within optimization subsystem 102. For example, control subsystem 104 may submit the output image data received from optimization subsystem 102 in conjunction with the previous subjection/cycle (e.g., in conjunction with the initial subjection/cycle in this example) as new input to the one or more image data optimization tools within optimization subsystem 102, receive additional output image data from the one or more image data optimization tools within optimization subsystem 102, and determine whether the additional output image data is optimized by at least a predetermined optimization threshold compared to the output image data submitted as new input to optimization subsystem 102. In this or a similar manner, image data optimization cycle 108 may continue to be repeated by control subsystem 104 repeatedly subjecting image data representative of the image to optimization subsystem 102 until the output image data received from optimization subsystem 102 fails to be optimized by the predetermined optimization threshold, at which point the output image data may be considered to be fully optimized and may be output as optimized image data 110 by control subsystem 104.

By submitting the output image data from the previous iteration of image data optimization cycle 108 as new input to the one or more image data optimization tools within optimization subsystem 102, with each iteration of image data optimization cycle 108 each image data optimization tools tool within optimization subsystem 102 may be provided an independent, new, and standalone opportunity at optimizing data representative of the image. In certain cases, such a fresh start using new input representative of the image in each of one or more repeat iterations of image data optimization cycle 108 helps produce improved image data optimization results as compared to results produced by an image data optimization tool operating alone without the benefit of control subsystem 104 repeatedly feeding new input representative of the image through the image data optimization tools tool until full optimization is achieved.

As mentioned, optimization subsystem 102 may include one or more image data optimization tools configured to optimize image data. Each image data optimization tool may be configured to optimize image data in any suitable way and/or using any suitable image data optimization technologies. In certain implementations, such as those described herein, each image data optimization tool is configured for lossless image data optimization. However, in certain alternative embodiments, one or more lossy image data optimization tools may be employed.

Examples of ways that each image data optimization tool may be configured to optimize image data may include, without limitation, reducing an image's color depth (e.g., reducing bit depth or color space), reconfiguring the image for display in grayscale rather than in a color space when the image contains only grayscale graphics (e.g., changing from a 32-bit RGBA image to 8-bit grayscale image having an alpha channel), removing an alpha channel from image data, reducing the bit depth of a palette of fixed colors used in the image (e.g., such that the palette includes only the colors included in the image), using custom commands to improve compression of image data (e.g., using custom zip commands to zip image data), preprocessing the image data to make it more compressible, filtering the image data to look for patterns in the image that may be used to represent the image and allow certain image data to be removed, removing chunks of image data that can be removed without corrupting or changing the image, fine tuning the way that the image data is compressed, removing or shortening data types that can be removed or shortened without changing the image, and/or performing any other image data optimization routine(s) to attempt to reduce the size of image data in any other way that does not change the image represented by the image data.

Each image data optimization tool may include a proprietary, commercially available, well known, or other image data optimization tool configured to optimize image data. For example, image data optimization tools may include tools known as "PNGOUT," "PNGCRUSH," "OptiPNG," "advPNG," "jpgtran," "JpegOptim," "Gifsicle," any other suitable image data optimization tools, and/or any combination or sub-combination thereof.

Figure 2:
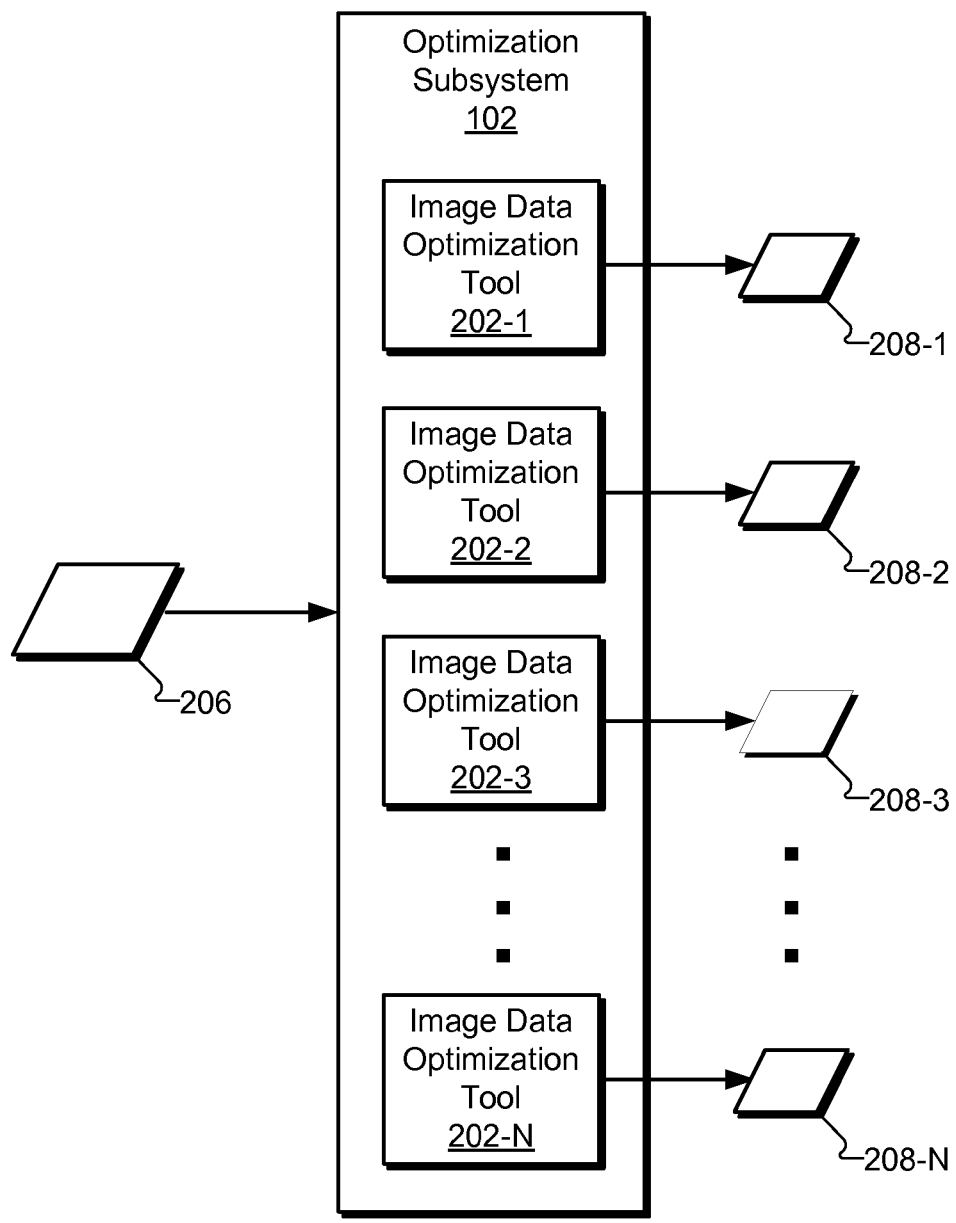
FIG. 2 illustrates an exemplary set of image data optimization tools in an image data optimization subsystem according to principles described herein.

Optimization subsystem 102 may include any number and/or configuration of image data optimization tools. For example, FIG. 2 illustrates an exemplary configuration of a plurality of image data optimization tools 202 (e.g., image data optimization tools 202-1 through 202-N) in optimization subsystem 102. Each of the image data optimization tools 202 may be configured to independently optimize image data. For example, each of the image data optimization tools 202 may independently receive image data 206 representative of an image (from control subsystem 104) as input, run image data 206 through an independent image data optimization routine associated with the image data optimization tool 202 to attempt to optimize the image data 206, and generate an output data instance. In FIG. 2, for example, image data optimization tools 202-1 through 202-N generate and provide independent output data instances 208-1 through 208-N, respectively.

By employing multiple independent image data optimization tools 202, various image data optimization routines may be independently applied to image data representative of an image, for each iteration of image data optimization cycle 108, to attempt to optimize the image data, thereby increasing opportunities for optimizations to be achieved. Each of the multiple image data optimization tools 202 may include a distinct image data optimization routine and/or be configured with settings distinct from the other image data optimization tools 202. This may further increase opportunities for optimizations to be achieved in each iteration of image data optimization cycle 108. For example, one of the image data optimization tools 202 using a particular image data optimization routine and/or particular settings may produce the greatest reduction in bit count in image data representative of an image in one iteration of image data optimization cycle 108, and another one of the image data optimization tools 202 using a different image data optimization routine and/or different settings may produce the greatest reduction in bit count in image data representative of the image in another iteration of image data optimization cycle 108.

The exemplary configuration of image data optimization tools 202 shown in FIG. 2 is illustrative only. Other configurations, including configurations having fewer or more image data optimization tools 202 or different configurations of image data optimization tools 202 (e.g., image data optimization tools 202 arranged serially), may be used in other embodiments.

Figure 3:
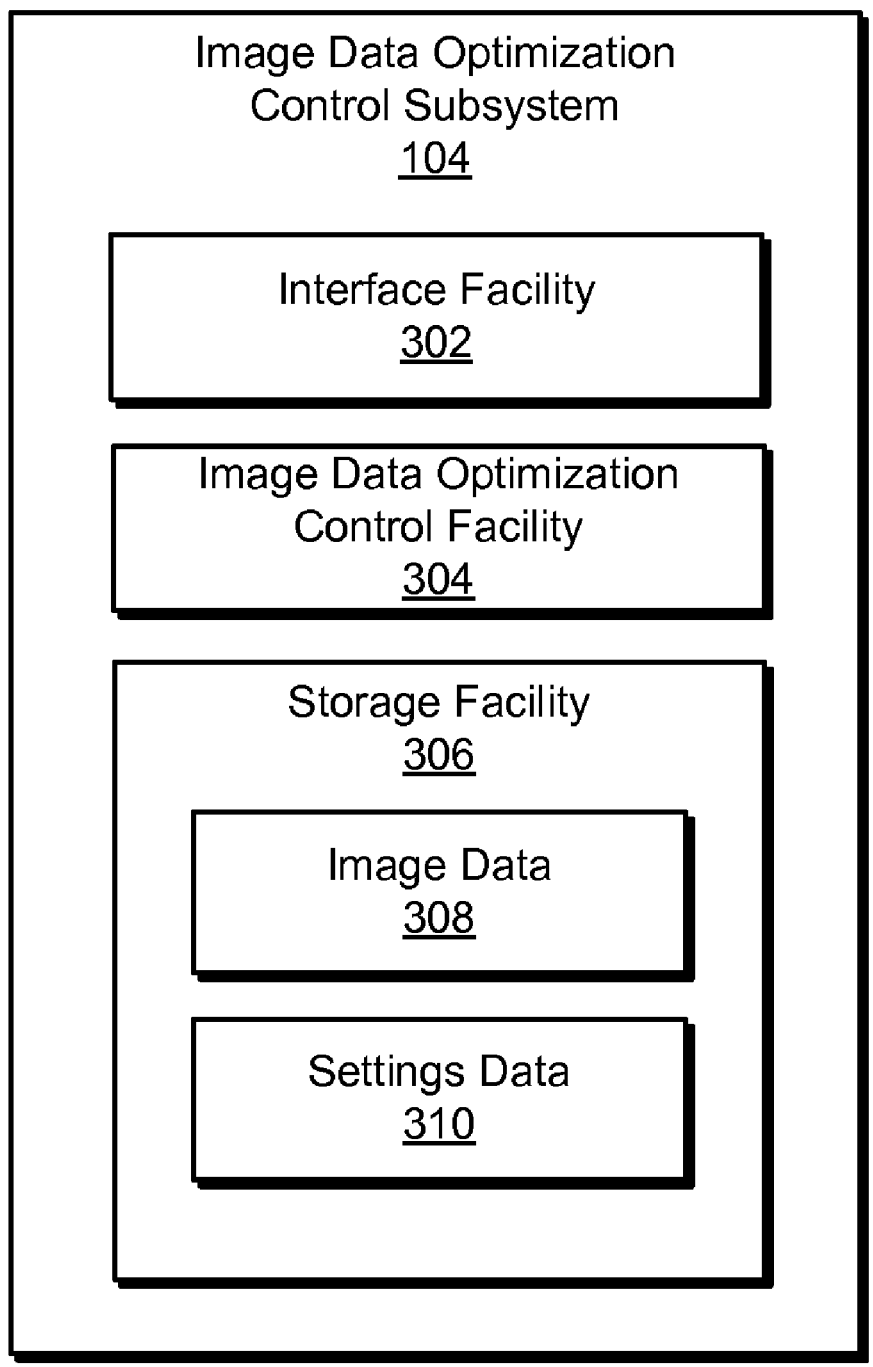
FIG. 3 illustrates exemplary components of an image data optimization control subsystem according to principles described herein.

FIG. 3 illustrates exemplary components of control subsystem 104. As shown, control subsystem 104 may include, without limitation, an interface facility 302, an image data optimization control facility 304 (or simply "control facility"), and a storage facility 306, which may be in communication with one another using any suitable communication technologies. It will be recognized that although facilities 302-306 are shown to the separate facilities in FIG. 3, any other facilities 302-306 may be combined into fewer facilities, such as into a single facility, or divided into more facilities as may serve a particular implementation.

Interface facility 302 may be configured to provide an interface through which control subsystem 104 may interface with optimization subsystem 102, including with one or more image data optimization tools 202 in optimization subsystem 102. Interface facility 302 may employ any suitable technologies to provide the interface with optimization subsystem 102. For example, interface facility 302 may be configured to interface with one or more APIs of optimization subsystem 102.

Through an interface to optimization subsystem 102 (i.e., to one or more image data optimization tools 202 in optimization subsystem 102), control subsystem 104 may externally (e.g., from outside of the one or more image data optimization tools 202 in optimization subsystem 102) control subjection of image data to image data optimization subsystem 104 for optimization, including by externally controlling how many iterations of image data optimization cycle 108 are performed for an image. For example, through the interface with optimization subsystem 102, control subsystem 104 may submit data representative of an image as input to at least one image data optimization tool 202 in optimization subsystem 102 for optimization and receive output data representative of the image from the at least one image data optimization tool 202 in optimization subsystem 102. The submission and receipt may be repeated for each iteration of image data optimization cycle 108.

Control subsystem 104 may use the interface with optimization subsystem 102 to submit image data as input to at least one image data optimization tool 202 in optimization subsystem in any suitable way, such as by adding the image data to a queue for processing by the at least one image data optimization tool 202. Similarly, control subsystem 104 may use the interface to receive output image data from at least one image data optimization tool 202 in optimization subsystem 102 in any suitable way.

External control through the interface over the number of times data representative of an image is submitted as new input to optimization subsystem 102 is distinct from the number of internal iterations performed by each image data optimization tool 202 in optimization subsystem 102. Accordingly, each image data optimization tool 202 may maintain its own unique settings that dictate internal optimization routines, and control subsystem 104 may externally control the number of times that data representative of an image is submitted to each image data optimization tool 202 for optimization.

Interface facility 302 may be further configured to provide an interface with an external source (e.g., a source external of system 100) such as an automated GUI design and development system or process. Interface facility 302 may employ any suitable technologies to provide the interface with the external source. For example, interface facility 302 may be configured to interface with one or more APIs of and/or to receive and respond to one or more calls from an automated GUI design and development system or process.

Control facility 304 may be configured to control operations of control subsystem 104. For example, control facility 104 may initiate an iteration of image data optimization cycle 108 such as by subjecting image data representative of an image to image data optimization cycle 108. This may be accomplished by control facility 304 causing the image data representative of the image to be submitted through interface facility 302 as input to optimization subsystem 102, as described above.

Control facility 304 may be configured to initiate an iteration of image data optimization cycle 108 in response to a predetermined event. For example, control facility 304 may be configured to initiate an initial iteration of image data optimization cycle 108 for an image in response to control subsystem 104 receiving initial image data 106 from an external source. In addition, control facility 304 may be configured to initiate one or more repeat iterations of image data optimization cycle 108 in response to output image data from the previous iteration of image data optimization cycle 108 being optimized by at least a predetermined optimization threshold. The predetermined optimization threshold may be set to any suitable value as may suit a particular implementation. In certain examples, the predetermined optimization threshold may be set to include any reduction in the bit count of the output image data as compared to the bit count of the image data submitted as input to optimization subsystem 102. With such settings in place, as long as some reduction in bit count is detected by control facility 304, the predetermined optimization threshold may be satisfied. In other examples, the predetermined optimization threshold may be set to another value as may suit a particular implementation.

When control facility 304 determines that the predetermined optimization threshold is satisfied, control facility 304 may initiate a repeat iteration of image data optimization cycle 108. For the repeat iteration of image data optimization cycle 108, control facility 304 may cause the output image data from the previous iteration of image data optimization cycle 108 to be submitted as new input to optimization subsystem 102.

When control facility 304 determines that the predetermined optimization threshold is not satisfied, control facility 304 may cause the output image data to be output as optimized image data representative of the image. For example, control facility 304 may cause that the output image data be provided as optimized image data 110 to the external source from which the initial image data 106 was received.

As described above, in certain implementations, optimization subsystem 102 may include a plurality of image data optimization tools 202 configured to optimize input image data 206 representative of an image and provide results in the form of independent output data instances 208 each representative of the image. In such implementations, control facility 304 may be configured to determine which of the output data instances 208 is most optimized as compared to the other output data instances 208. Any suitable criteria may be used by control facility 304 to identify a most-optimized output data instance from a group of output data instances. In certain implementations, for example, the most-optimized output data instance may be identified as the output data instance that has a largest reduction in bit count as compared to the other output data instances representative of the image.

Control facility 304 may be configured to select the most-optimized output data instance representative of the image as the output data to be used by control facility 304 to determine whether to initiate a repeat iteration of image data optimization cycle 108. When control facility 304 determines that a repeat iteration of image data optimization cycle 108 is to be initiated as described above, control facility 304 may provide the selected most-optimized output data as new input to optimization subsystem 102. Accordingly, for each repeat iteration of image data optimization cycle 108, the most-optimized output data instance from the previous iteration of image data optimization cycle 108 may be provided as new input for the repeat iteration of image data optimization cycle 108.

Storage facility 306 may be configured to maintain image data 308, which may include both input and output image data representative of an image, and settings data 310 representative of settings to be used by control facility 304 to control operations of control subsystem 104, such as for determining when to initiate a repeat iteration of image data optimization cycle 108 for image data representative of an image. Storage facility 308 may be configured to maintain additional and/or alternative data as may suit a particular implementation.

Figure 4:
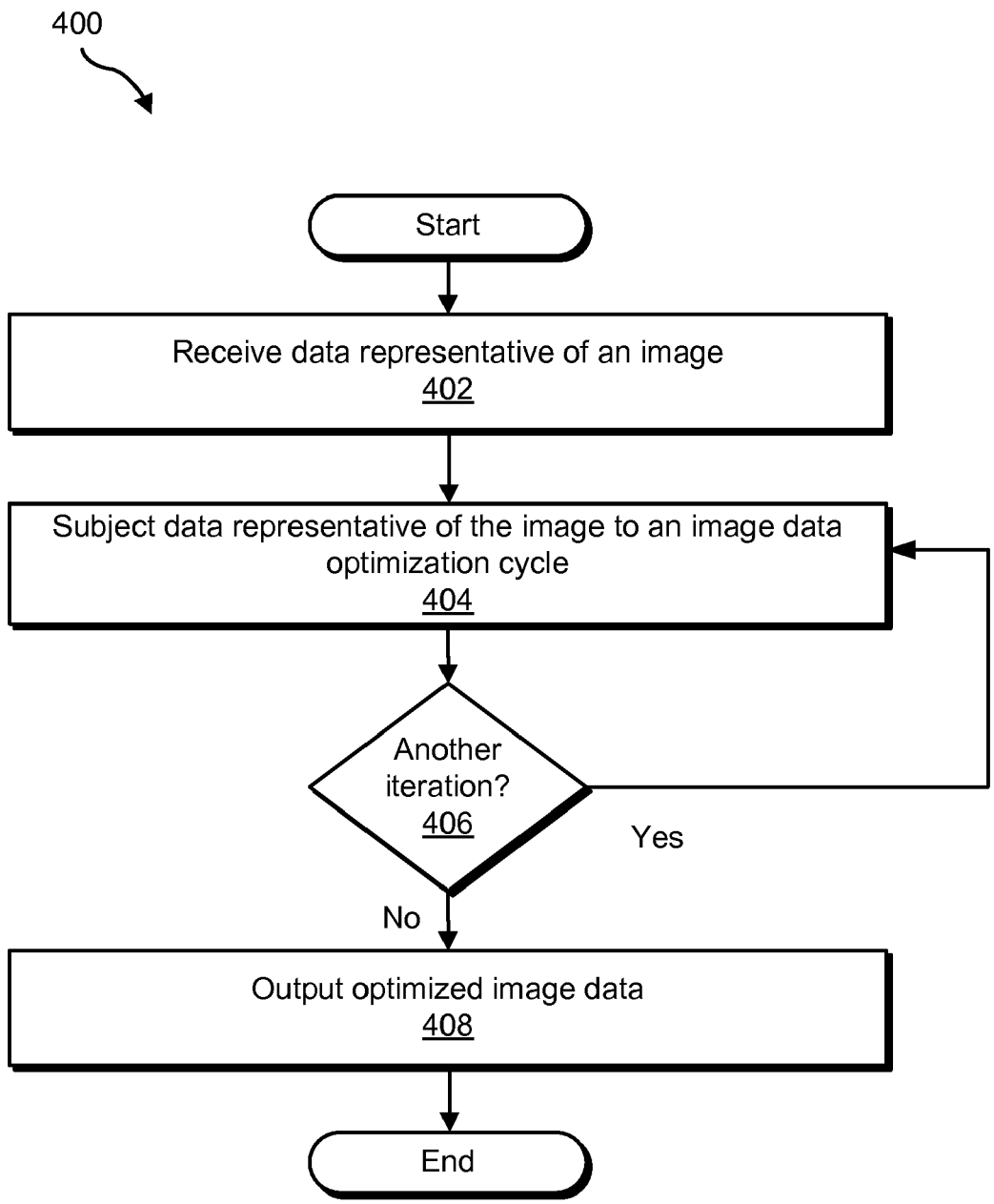
FIGS. 4-6 illustrate exemplary image data optimization methods according to principles described herein.
Figure 5:
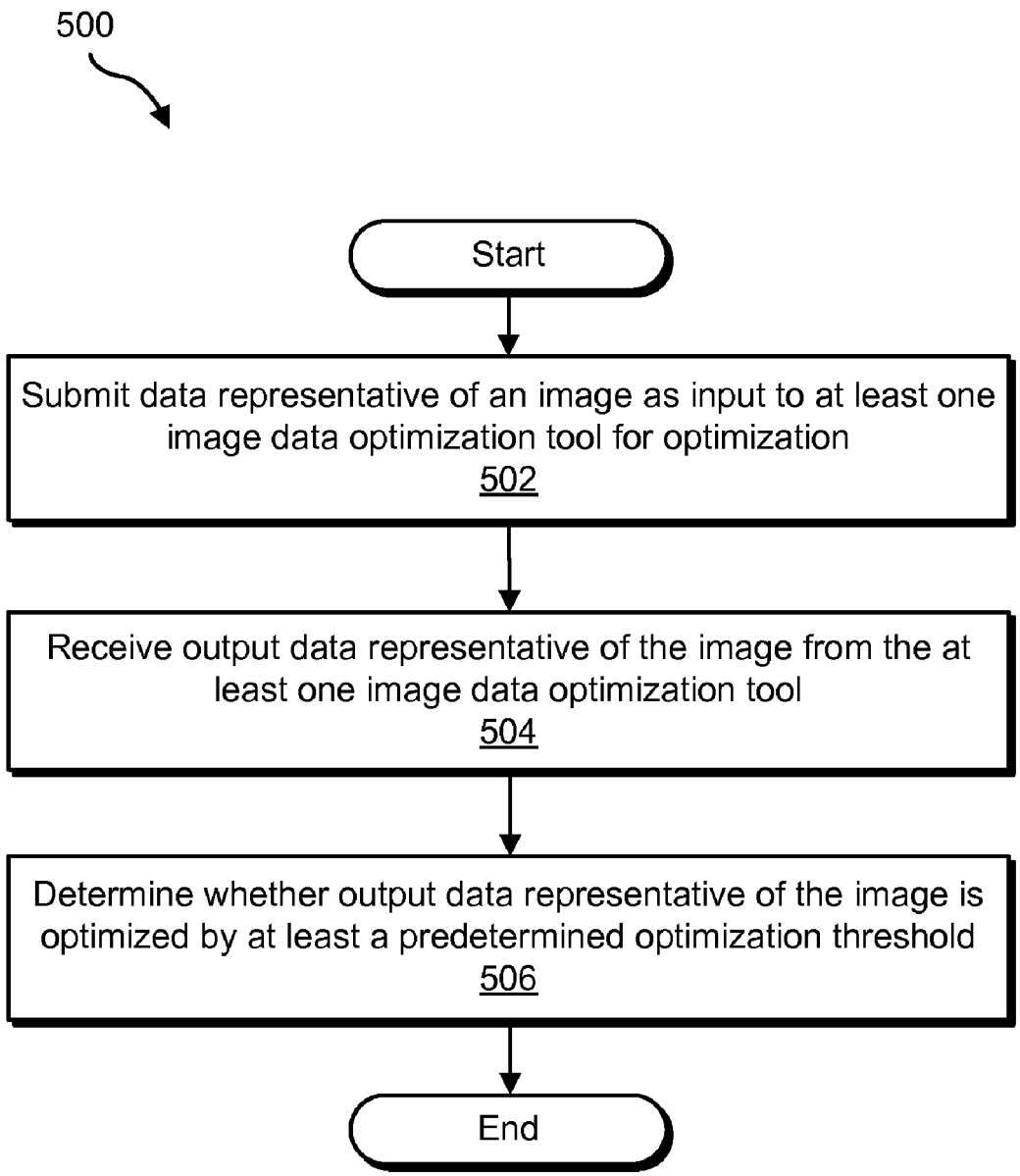
Figure 6:
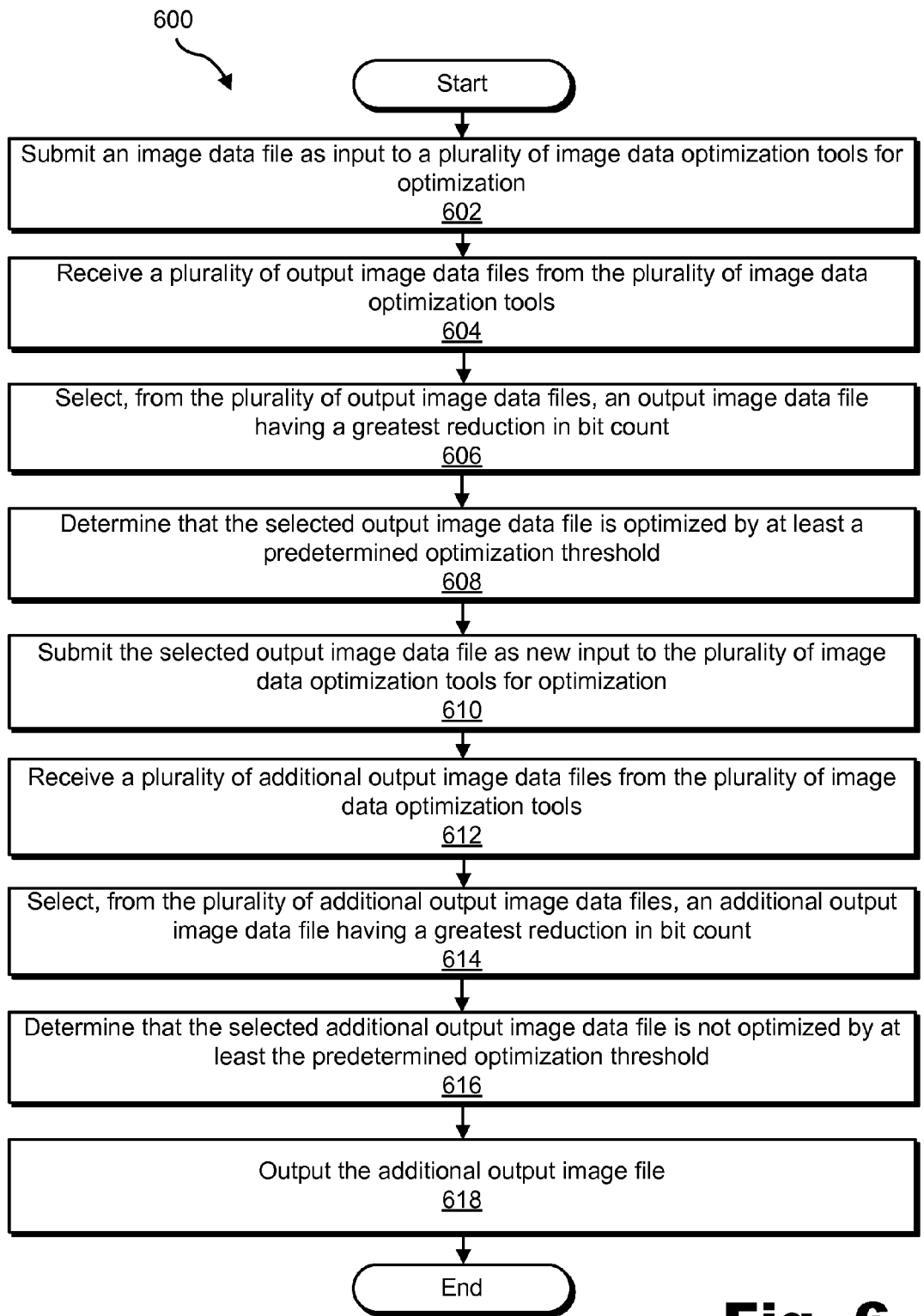

FIGS. 4-6 illustrate exemplary image data optimization methods 400-600. While FIGS. 4-6 illustrate exemplary steps according to certain embodiments, other embodiments may omit, add to, reorder, combine, and/or modify any of the steps shown in FIGS. 4-6. The steps shown in FIGS. 4-6 may be performed by control subsystem 104 and/or any other component(s) of system 100.

Referring now to method 400 in FIG. 4, in step 402, data representative of an image may be received. For example, control subsystem 104 may receive initial image data 106 from an external source such as an automated GUI design and development system or process.

In step 404, data representative of the image may be subjected to an image data optimization cycle. For example, control subsystem 104 may subject data representative of the image (e.g., initial image data 106) to image data optimization cycle 108, such as described herein.

In response to the subjection of data representative of the image to the image data optimization cycle in step 404, method 500 shown in FIG. 5 may be performed. One or more of the steps of method 500 may make up the image data optimization cycle of step 404. Accordingly, each iteration of the image data optimization cycle may include performance of one or more of the steps of method 500 shown in FIG. 5.

In step 502, data representative of the image may be submitted as input to at least one image data optimization tool for optimization. For example, control subsystem 104 may submit data representative of the image as input to at least one image data optimization tool 202 in optimization subsystem 102 for optimization, such as described herein.

In step 504, output data representative of the image may be received from the at least one image data optimization tool. For example, control subsystem 104 may receive output data representative of the image from the at least one image data optimization tool 202 in optimization subsystem 102 in response to the submission in step 502, such as described herein.

In step 506, a determination may be made as to whether the output data representative of the image received in step 504 is optimized by at least a predetermined optimization threshold. For example, control subsystem 104 may be configured to determine whether the output data representative of the image is optimized by at least the predetermined optimization threshold, such as described herein.

Returning to FIG. 4, in step 406, a determination may be made as to whether another iteration of the image data optimization cycle is to be performed. The determination in step 406 may be based on the determination made in step 506 of FIG. 5 as to whether the output data representative of the image is optimized by at least the predetermined optimization threshold. For example, in response to a determination that the output data representative of the image is optimized by at least the predetermined optimization threshold in step 506, control subsystem 104 may determine in step 406 that another iteration of the image data optimization cycle is to be performed. In response to this determination, processing may return to step 404 as shown in FIG. 4. Step 404 may then be repeated by subjecting data representative of the image to the image data optimization cycle (i.e., for another iteration of the image data optimization cycle). For the repeat iteration of the image data optimization cycle in step 404, the output data from the previous iteration of the image data optimization cycle may be submitted as new input to the at least one image data optimization tool for optimization in step 502 of FIG. 5.

Steps 404 and 406 may continue to be repeated to repeatedly subject data representative of the image to the image data optimization cycle for optimization by the at least one image data optimization tool until output image data representative of the image provided by the at least one image data optimization tool fails to be optimized by at least the predetermined optimization threshold. In response to such a determination (i.e., that output data representative of the image is not optimized by at least the predetermined optimization threshold), processing may move from step 406 to step 408.

In step 408, optimized image data may be output. For example, control subsystem 104 may output optimized image data 110 to the external source from which the initial image data 106 was received. The optimized image data output in step 408 may comprise the output data determined not to be optimized by at least the predetermined optimization threshold, which may represent a fully optimized version of the data representative of the image.

The repeated subjection of data representative of an image to an image data optimization cycle for optimization by at least one image data optimization tool may include an initial subjection and one or more subsequent subjections of data representative of the image to the image data optimization cycle. For example, the initial subjection to the image data optimization cycle may include a submission of initial image data representative of the image (e.g., initial image data 106) to the at least one image optimization tool for optimization, and each of the one or more subsequent subjections to image data optimization cycle may include a submission of image data output by the at least one image optimization tool in conjunction with the previous subjection to the image data optimization cycle (i.e., the previous iteration of the image data optimization cycle) as new input to the at least one image data optimization tool for optimization. Accordingly, for each repeat iteration of the image data optimization cycle, output from the previous iteration of the image data optimization cycle may be submitted as new input such that one or more image data optimization tools 202 included in optimization subsystem 102 may have a fresh start with new input data representative of the image with each iteration of the image data optimization cycle.

Referring now to FIG. 6, another exemplary image data optimization method 600 will be described. In step 602, an image data file may be submitted as input to a plurality of image data optimization tools for optimization. For example, control subsystem 104 may submit an image data file as input to a plurality of image data optimization tools 202 in optimization subsystem 102 for optimization, such as described herein.

In step 604, a plurality of output image data files may be received from the plurality of image data optimization tools. For example, control subsystem 104 may receive a plurality of output image data files from the plurality of image data optimization tools 202 included in optimization subsystem 102, such as described herein. The plurality of output image data files may be received in response to the submission of the image data file as input to the plurality of image data optimization tools in step 602.

In step 606, an output image data file having a greatest reduction in bit count may be selected from the plurality of output image data files received in step 604. For example, control subsystem 104 may select, from the plurality of output image data files received in step 604, an output image data file having a greatest reduction in bit count compared to the other output image data files included in the plurality of output image data files, such as described herein.

In step 608, a determination may be made that the selected output image data file is optimized by at least a predetermined optimization threshold. For example, control subsystem 104 may determine that the output image data file selected in step 606 is optimized by at least the predetermined optimization threshold, such as described herein.

In step 610, the selected output image data file may be submitted as new input to the plurality of image data optimization tools for optimization. For example, control subsystem 104 may submit the output image data file selected in step 606 as new input to the plurality of image data optimization tools for optimization in response to the determination in step 608 that the selected output image data file is optimized by at least the predetermined optimization threshold, such as described herein.

In step 612, a plurality of additional output image data files may be received from the plurality of image data optimization tools. For example, control subsystem 104 may receive, in response to the submission of the output image data file selected in step 606 as new input to the plurality of image data optimization tools in step 610, a plurality of additional output image data files from the plurality of image data optimization tools.

In step 614, an additional output image data file having a greatest reduction in bit count may be selected from the plurality of additional output image data files received in step 612. For example, control subsystem 104 may select, from the plurality of additional output image files received in step 612, an additional output image data file having a greatest reduction in bit count compared to the other additional output image data files included in the plurality of additional output image data files, such as described herein.

In step 616, a determination may be made that the selected additional output image data file is not optimized by at least the predetermined optimization threshold. For example, control subsystem 104 may determine that the selected additional output image data file is not optimized by at least the predetermined optimization threshold, such as described herein.

In step 618, the additional output image data file may be output. For example, control subsystem 104, in response to the determination that the additional output image data file is not optimized by at least the predetermined optimization threshold in step 616, may output the additional output image data file as a final optimized output data file.

While method 600 in FIG. 6 includes particular method steps illustrative of an initial submission followed by a single repeat submission of data representative of an image for optimization, the example is illustrative only. Typically, multiple repeat submissions of data representative of an image may be performed until a most-optimized output produced by the plurality of image data optimization tools is no longer optimized by the predetermined optimization threshold.

The exemplary image data optimization systems and methods described herein may help conserve memory resources in computing systems by optimizing image data to minimize the memory footprint used to store the image data. The exemplary image data optimization systems and methods may be implemented in and/or used by a variety of applications in which optimized image data may be desirable. An exemplary implementation of the image data optimization systems and methods described herein as part of automated GUI design and development systems and processes will now be described.

Figure 7:
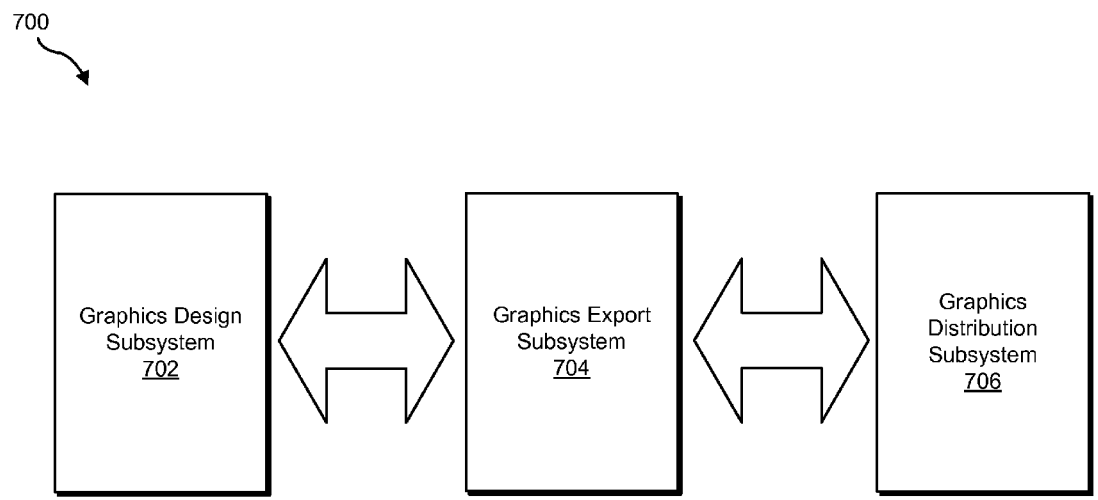
FIG. 7 illustrates an exemplary automated graphical user interface design and development system according to principles described herein.

FIG. 7 illustrates an exemplary automated GUI design and development system 700 (or simply "system 700"). As shown in FIG. 7, system 700 may include a graphics design subsystem 702 (or simply "design subsystem 702"), a graphics export subsystem 704 (or simply "export subsystem 704"), and a graphics distribution subsystem 706 (or simply "distribution subsystem 706") configured to communicate or otherwise interface with one another as shown. Each of the elements of system 700 will now be described in detail.

Design subsystem 702 may include or be implemented by one or more design tools with which a designer may interact to define a GUI screen design. In certain implementations, the tools may include one or more commercially available or proprietary GUI screen design software applications, such as Adobe Illustrator, Adobe Photoshop, and/or any other suitable GUI screen design software application(s).

Design subsystem 702 may be configured to provide a user interface through which a designer may interact with design subsystem 702 to define a GUI screen design. The user interface may be configured to visually depict the GUI screen design such that the designer may interact with the visual depiction to define and/or modify the GUI screen design.

Design subsystem 702 may be configured to maintain data representative of a GUI screen design defined by a designer. The data representative of the GUI screen design may be maintained in any suitable data format, such as a vector-based, bitmap-based, or other suitable data format.

Figure 8:
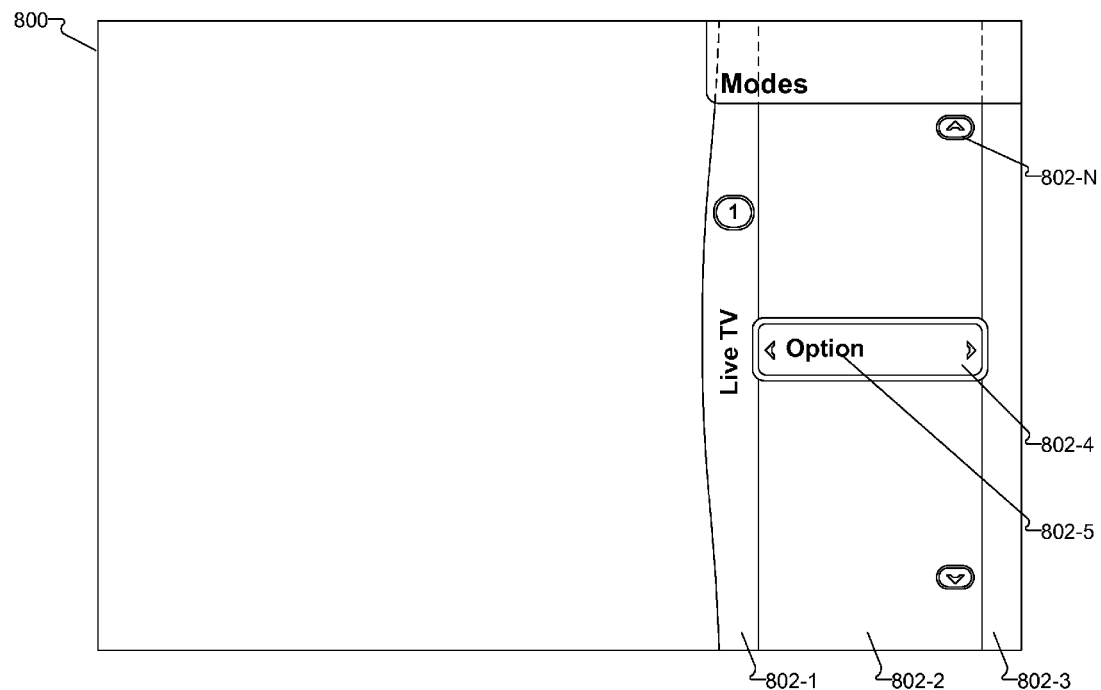
FIG. 8 illustrates a visual depiction of a graphical user interface screen design according to principles described herein.

A GUI screen design may include a visual layout of one or more graphical elements configured to be displayed within dimensions of a GUI screen. FIG. 8 illustrates a visual depiction of an exemplary GUI screen design 800. As shown, GUI screen design 800 may include one or more graphical elements, such as, but not limited to, graphical elements 802-1 through 802-N, positioned within dimensions of GUI screen design 800 to form a visual layout of the graphical elements. Graphical elements, such as graphical elements 802-1 through 802-N, may be layered in a particular order within a GUI screen design. In some examples, each graphical element may correspond to a different layer of the GUI screen design.

A graphical element may include any element that may be visually displayed within a GUI screen. For example, a graphical element may include one or more graphics, text, or a combination of text and one or more graphics that may be displayed within a GUI screen. Examples of graphical elements may include, without limitation, a scroll bar, a navigation arrow, a button, a selector, a selectable menu option, and any other graphic and/or text.

Design subsystem 702 may be configured to maintain data representative of one or more graphical elements included in a GUI screen design. Data representative of a graphical element may include an identifier for the graphical element (e.g., an element or layer name), position data indicative of a position of the graphical element within the GUI screen design, pixel data for the graphical element (e.g., pixel data specifying hue, color, saturation, transparency, brightness, and/or other attributes of one or more pixels), text data (e.g., text string, font size, letting information, alignment, and/or other text properties), and any other data descriptive of or otherwise associated with the graphical element.

Design subsystem 702 may include an interface through which export subsystem 704 may interface with design subsystem 702. Any suitable interface may be employed, such as one or more application program interfaces ("APIs").

Export subsystem 704 may be configured to interface with design subsystem 702, including interacting with design subsystem 702 to access and/or facilitate processing of data representative of a GUI screen design. Export subsystem 704 may utilize the accessed data and/or the interface with design subsystem 702 to automatically generate and export computing code configured to be processed by one or more target computing devices (e.g., target computing devices having different computing platforms) to render the GUI screen in accordance with the GUI screen design. Alternatively or additionally, export subsystem 704 may utilize the accessed data and/or the interface with design subsystem 702 to automatically generate and export data representative of one or more streamlined graphical elements representative of one or more graphical elements included in the GUI screen design. Alternatively or additionally, export subsystem 704 may utilize the accessed data and/or the interface with design subsystem 702 to automatically generate, in any of the ways described herein, and export data representative of one or more optimized graphical elements representative of one or more graphical elements included in the GUI screen design. Export subsystem 704 may export the computing code, streamlined graphical elements, and/or optimized graphical elements to distribution subsystem 706 for access by a developer, as described below.

Figure 9:
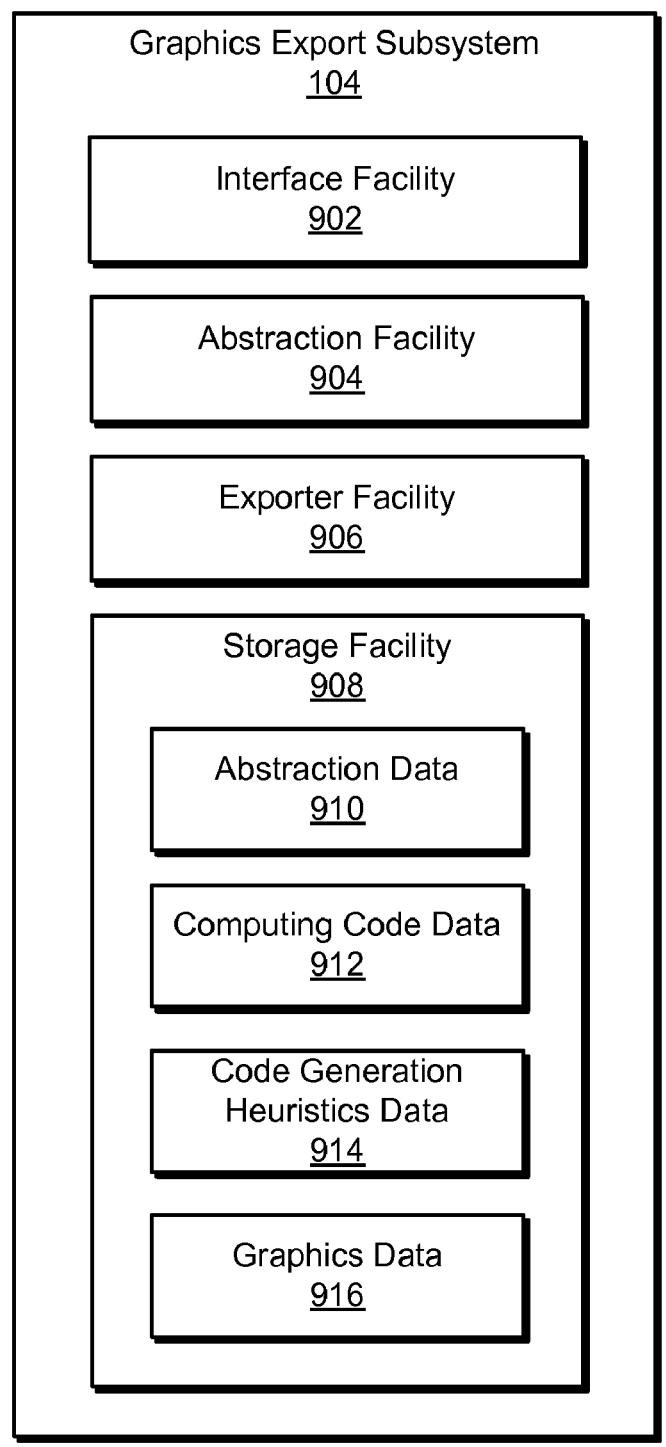
FIG. 9 illustrates exemplary components of a graphics export subsystem according to principles described herein.

FIG. 9 illustrates exemplary components of export subsystem 704. As shown, export subsystem 704 may include, without limitation, an interface facility 902, an abstraction facility 904, an exporter facility 906, and a storage facility 908, which may be in communication with one another using any suitable communication technologies. It will be recognized that although facilities 902-908 are shown to be separate facilities in FIG. 9, any of facilities 902-908 may be combined into fewer facilities, such as into a single facility, or divided into more facilities as may serve a particular implementation.

Interface facility 902 may be configured to provide an interface through which export subsystem 704 may interface with design subsystem 702. Interface facility 902 may employ any suitable technologies to provide the interface with design subsystem 702. For example, interface facility 902 may be configured to interface with one or more APIs of design subsystem 702.

Through an interface with design subsystem 702, export subsystem 704 may access data representative of a GUI screen design maintained by design subsystem 702. Additionally or alternatively, through an interface with design subsystem 702, export subsystem 704 may access and leverage one or more capabilities of design subsystem 702. For example, export subsystem 704 may instruct design subsystem 702 to perform one or more operations to process data representative of a GUI screen design and/or graphical elements included in the GUI screen design. Examples of export subsystem 704 interfacing with design subsystem 102 are described further below.

Interface facility 902 may be further configured to provide an interface through which export subsystem 704 may interface with distribution subsystem 706. Interface facility 902 may employ any suitable technologies for providing an interface with distribution subsystem 706. Through an interface with distribution subsystem 706, export subsystem 704 may export data, including computing code, streamlined graphical elements, and/or optimized graphical elements generated by export subsystem 704, to distribution subsystem 706 for distribution to and access by a developer.

Interface facility 902 may be further configured to provide an interface through which a user may interact with export subsystem 704. For example, a user such as a designer may provide user input to export subsystem 704 through a user interface provided by interface facility 902 to direct export subsystem 704 to perform one or more of the operations described herein. In certain implementations, for example, execution of one or more of the operations of export subsystem 704 described herein may be initiated by a user selecting an "export" option provided in a user interface.

In certain examples, interface facility 902 may be configured to interface with design subsystem 702 to leverage a user interface and/or user interface capabilities native to design subsystem 702. For example, interface facility 902 may instruct design subsystem 702 to display certain content in a user interface of design subsystem 702. The content may be representative of one or more operations performed by export subsystem 704 such that a designer may be apprised of the status of operations of export subsystem 704. For instance, the designer may be audibly and/or visually notified when one or more operations of export subsystem 704 are being performed and/or have completed.

Abstraction facility 904 may be configured to automatically generate abstraction data representative of a GUI screen design maintained by design subsystem 702. For example, through interface facility 902, export subsystem 704 may access data maintained by design subsystem 702 and representative of the GUI screen design. Abstraction facility 904 may generate abstraction data representative of the GUI screen design based on the data maintained by design subsystem 702 and accessed through interface facility 902.

Abstraction data may be defined in accordance with any data format and/or data structure that is suitable for use by exporter facility 906 to generate computing code configured to be processed by target computing devices having different computing platforms. In certain implementations, for example, abstraction data may be maintained in one or more arrays or lists (e.g. as items (e.g., one or more key/value pairs) in one or more lists or arrays).

Abstraction data may provide a level of abstraction between data maintained by design subsystem 702 and generation of computing code configured to be processed by one or more target computing devices to render a GUI screen represented by the data maintained by design subsystem 702. The level of abstraction may be leveraged to automatically generate computing code for multiple different computing platforms.

Abstraction data may include any information representative of or otherwise associated with a GUI screen design and/or one or more graphical elements included in the GUI screen designs. For example, for each graphical element included in a GUI screen design, abstraction data may include data descriptive of dimensions of the graphical element, positioning of the graphical element within the GUI screen design, (e.g., offset values from a reference position), identifier data (e.g., a name), type indicator data, (e.g., a button type element, a text field type element, etc.), and text data representative of any text properties of the graphical element.

Abstraction data may include normalized data, which may allow one or more settings that may vary in design subsystem 702 to be compensated for in the abstraction data. For example, position data included in the abstraction data may be normalized. To this end, abstraction facility 904 may be configured to normalize position data maintained by design subsystem 702. Such normalization may compensate for any differences or variations in how design subsystem 702 represents position, including by compensating for movement of and/or use of different position reference points. Such position normalization may facilitate pixel perfect positioning of graphical elements in a rendered GUI screen.

Abstraction facility 904 may be configured to normalize position data for inclusion in the abstraction data in any suitable way and using any suitable technologies. An example of how abstraction facility 904 may normalize position data is described further below.

Exporter facility 906 may be configured to automatically generate computing code configured to be processed by one or more target computing devices to generate a GUI screen in accordance with a GUI screen design. The generation of the computing code may be based on data maintained by and access from design subsystem 702 and/or abstraction data generated by abstraction facility 904 that is representative of the GUI screen design. For example, exporter facility 906 may be configured to step through and utilize abstraction data entries to generate computing code based on the abstraction data entries.

In certain embodiments, exporter facility 906 may be configured to generate computing code in multiple different languages, which may include different programming languages and/or data structures. Accordingly, the computing code may be configured to be processed by one or more target computing devices having multiple different computing platforms.

As used herein, the term "computing code" may refer to any code that may be processed by a computing device to render a GUI screen for display. As an example, computing code may include programming code such as source code, object code, or other executable code. As another example, computing code may include one or more data structures containing data representative of a GUI screen, wherein the data in the one or more data structures is configured to be parsed by a computing device to render the GUI screen. Examples of such data structures may include an Extensible Markup Language ("XML") data structure, a comma-separated value ("CSV") data structure, and any other data structure that may be parsed by a computing device to render a GUI screen.

As used herein, the term "computing platform" may refer to a computing architecture, process, and/or system configured to process a particular type or format of data, process data in a particular way, and/or perform computing operations in a particular way that is distinct from another computing platform. For example, different computing platforms may be configured to render a graphical user interface in different ways, using different data formats, and/or in accordance with different GUI rendering heuristics. To illustrate, a computing platform may use a particular reference position (e.g., a top-left position of a display screen) to render a GUI screen while another computing platform may use another reference position (e.g., a bottom-left position of a display screen) to render a GUI screen.

Exporter facility 906 may be configured to generate computing code in accordance with one or more code generation heuristics maintained in a library of code generation heuristics. Each code generation heuristic in the library may be configured to direct exporter facility 906 as to how to generate computing code configured to be processed by a target computing device having a particular computing platform. In certain embodiments, each code generation heuristic in the library may be configured to direct exporter facility 906 as to how to generate computing code based on abstraction data generated by abstraction facility 904. By generating computing code from abstraction data, exporter facility 906 may be conveniently configured to generate computing code in multiple different programming languages for multiple different computing platforms. For example, a code generation heuristic associated with a particular computing platform may be conveniently added by a user to the library of code generation heuristics to configure exporter facility 906 to generate computing code for that particular computing platform.

Additionally or alternatively, exporter facility 906 may be configured to automatically generate streamlined graphical elements representative of graphical elements included in a GUI screen design. As used herein, the term "streamlined graphical element" may refer to a graphical element from which extraneous data has been removed to make the graphical element efficient. For example, exporter facility 906 may remove extraneous data from the data representative of the graphical element that is maintained by design subsystem 702 to form a streamlined graphical element. As an example, exporter facility 906 may be configured to remove data associated with one or more transparent pixels (e.g., one hundred percent transparent pixels) from the data representative of the graphical element. As another example, exporter facility 906 may be configured to remove data associated with one or more pixels positioned outside of dimensions of the GUI screen. As yet another example, exporter facility 906 may be configured to remove data associated with one or more pixels positioned outside of dimensions of the graphical element. By removing extraneous data, exporter facility 906 may generate data representative of a streamlined graphical element.

In some examples, the generation of a streamlined graphical element may normalize the data used to represent the graphical element with data used to represent other graphical elements. This may promote efficient storage and maintenance of data representative of streamlined graphical elements. For example, normalized data representative of graphical elements may facilitate duplication detection within a repository of graphical elements.

In certain implementations, streamlined graphical elements may be configured to be referenced by computing code such that when the computing code is processed by a target computing device, the streamlined graphical elements may be accessed and used to render a GUI screen.

Additionally or alternatively, exporter facility 906 may be configured to automatically generate optimized graphical elements representative of graphical elements included in a GUI screen design. Exporter facility 906 may employ and/or call any of the exemplary image data optimization systems and methods described herein to generate optimized graphical elements. For example, exporter facility 906 may provide data representative of one or more graphical elements (e.g., one or more streamlined graphical elements) as initial image data 106 to system 100, which may optimize the data representative of the one or more graphical elements as described herein and output optimized image data 110 representing optimized versions of the one or more graphical elements to exporter facility 906.

Exporter facility 906 may be further configured to export data representative of generated computing code, streamlined graphical elements, optimized graphical elements, and/or other data generated by exporter facility 906 to distribution subsystem 706 for distribution to and access by a developer. The data may be exported to distribution subsystem 706 in any suitable way, including through an interface provided by interface facility 902. In certain implementations, data generated by exporter facility 906 may be automatically exported by export subsystem 704 to distribution subsystem 706.

Storage facility 908 may be configured to maintain abstraction data 910 (which may include any of the abstraction data described herein), computing code data 912 representative of computing code (e.g., any of the computing code described herein), code generation heuristic data 914 representative of one or more code generation heuristics, and graphics data 916 representative of one or more graphical elements (e.g., one or more initial, streamlined, and/or optimized graphical elements). Storage facility 908 may be configured to maintain additional and/or alternative data as may suit a particular implementation.

Distribution subsystem 706 may be configured to provide a developer with access to computing code, streamlined graphics data, optimized graphics data, and/or any other data exported by export subsystem 704. Distribution subsystem 706 may be configured to provide the access in any suitable way. For example, distribution subsystem 706 may include one or more staging servers and/or one or more data repositories that may be accessed by a developer. Additionally or alternatively, distribution subsystem 706 may be configured to provide a notification service configured to notify a developer of exported data (e.g., by sending a notification email to the developer).

In certain implementations, distribution subsystem 706 may include a designer repository configured to maintain exported data and a developer repository (e.g., a version control repository) synchronized to include the same data as the designer repository. In such a configuration, export subsystem 704 may export data to the designer repository, which may store the data and automatically communicate with the developer repository such as by providing one or more updates for use by the developer repository to update data in the developer repository to match the data in the designer repository. In certain examples, the synchronized repositories may be configured to store data in matching directory data structures, which may further automate development of computing code and/or access to graphics data, as described further below.

The data exported by export subsystem 704 and made available to a developer by distribution subsystem 706 may be in a form that is beneficial to the developer. For example, rather than having to manually produce computing code for a GUI screen based on a GUI screen design as required in conventional GUI design and development processes, a developer with access to data exported by export subsystem 704 may conveniently insert, or otherwise make reference to, exported computing code, such as by copying and pasting the pre-generated computing code, into code being produced by the developer or into another appropriate location for processing by a target computing device. This may be done by the developer because the computing code exported by export subsystem 704 is configured to be processed by a target computing device to render a GUI screen. Consequently, the developer is able to produce code for rendering a GUI screen more efficiently and with fewer opportunities for error when compared to conventional GUI design and development processes.

An exemplary implementation and exemplary operations of system 700 will now be described. In an exemplary implementation, design subsystem 702 may include a vector graphics design tool and a bitmap graphics design tool, such as Adobe Illustrator and Adobe Photoshop, for example. Export subsystem 704 may be configured to interface with the vector and bitmap graphics design tools.

Figure 10:
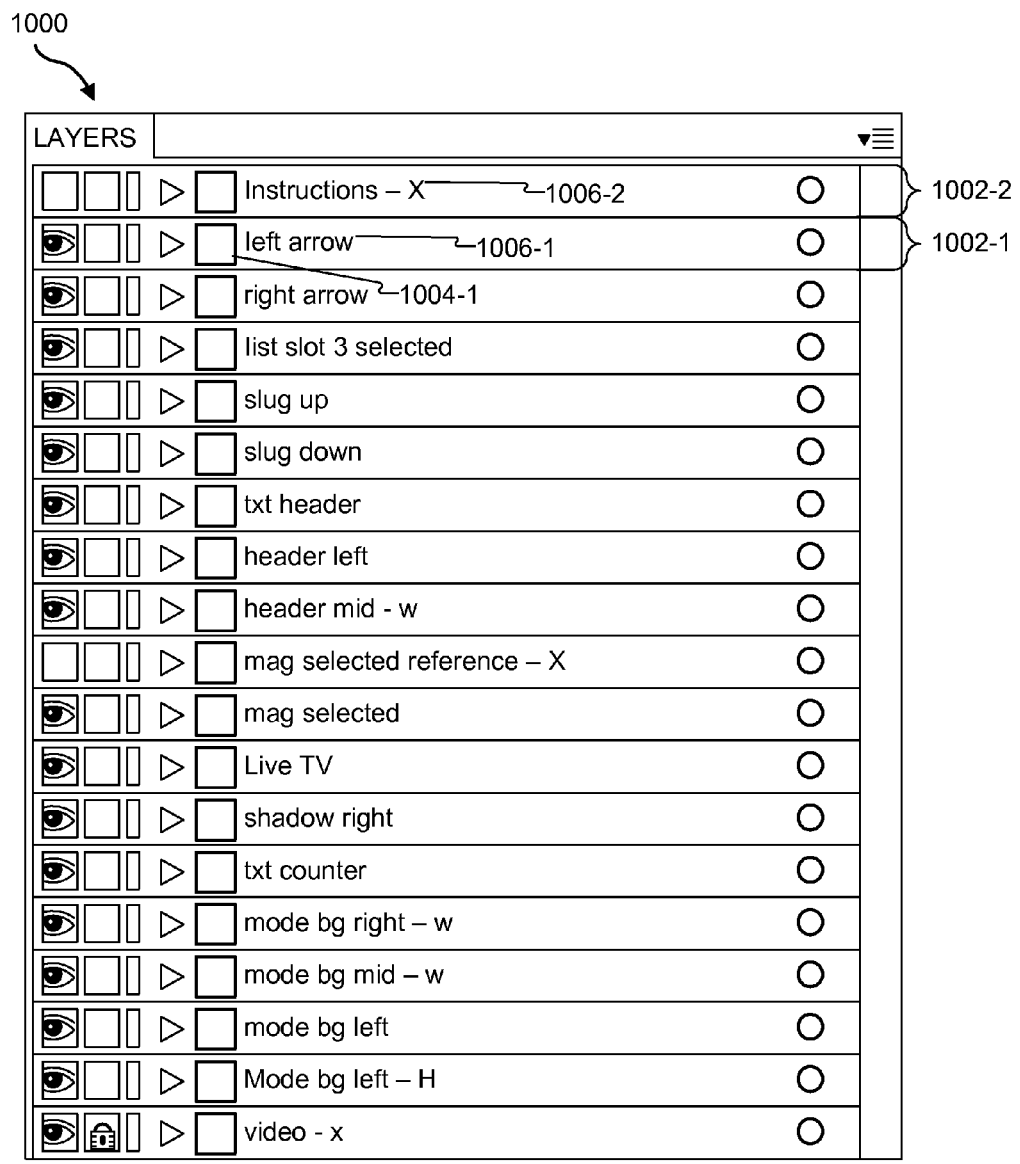
FIG. 10 illustrates an ordered list of layers associated with a graphical user interface screen design according to principles described herein.

A designer may interact with the vector graphics design tool to define a GUI screen design, such as GUI screen design 800 shown in FIG. 8. Each graphical element in the GUI screen design may correspond to a logical construct known as a layer in the GUI screen design. The vector graphics design tool may maintain and present data representative of the layers in the GUI screen design. For example, FIG. 10 illustrates an ordered list 1000 of layers associated with GUI screen design 800. The order of the layers in list 1000 may represent an order in which the layers are layered in GUI screen design 800. List 1000 may also specify information about the layers. For example, row 1002-1 in list 1000 may represent a layer corresponding to a particular graphical element included in GUI screen design 800. Row 1002-1 may include a thumbnail image 1004-1 of the graphical element, a layer name 1006-1 (e.g., "left arrow"), and/or any other information related to the graphical element.

A designer may define layer names. In certain examples, export subsystem 704 may be configured to perform or refrain from performing one or more operations in response to and/or based on in-line commands included in layer names. Accordingly, a designer who has knowledge of the capabilities of export subsystem 704 may define layer names to include in-line commands to cause export subsystem 704 to perform or refrain from performing operations on certain layers. To illustrate, row 1002-2 in list 1000 may represent a layer corresponding to instructions defined by a designer for use by a developer. A layer name 1006-2 for the layer may include an in-line command (e.g., "-X") that is configured to direct export subsystem 704 to refrain from performing one or more operations (e.g., rasterizing, exporting, etc.) on the instructions layer. Other in-line commands may be used. For example, in-line commands may be configured to indicate if a graphical element is to be stretched horizontally in width (e.g., a "-w" command) or vertically in height (e.g., a "-H" command). As another example, in-line commands may be employed to indicate a class or type of graphical element associated with a layer, such as whether the graphical element is a text-type, graphics-type, or complex-type (including both text and graphics) graphical element, or whether the graphical element is a button (e.g., "-btn") type element or another type of element. Export subsystem 704 may be configured to detect and utilize in-line commands included in layer names to direct processing of graphical elements, including in any of the ways described herein.

In certain implementations, export subsystem 704 may be configured to process one or more value-add type layers that a designer may add to a GUI screen design. For example, a designer may add an instructions layer that includes text instructing a developer concerning the desired functionality of the GUI screen. Export subsystem 704 may be configured to save an instructions layer to a file that may be exported for distribution to the developer. As another example, a designer may add a commands and classes layer that defines classes for one or more layers included in the GUI screen design and associated the classes with the names of the layers. For example, the layer may define whether a layer is a text or button class layer. The layer may further define, for each layer, a set of operations that are to be performed in response to occurrences of one or more events associated with the layer. As an example, in response to a button selection, a particular subroutine may be called. As another example, the layer may specify how a graphical element is to be animated when the GUI screen is rendered or closed. Export subsystem 704 may be configured to consider data included in such a commands and classes layer and to incorporate the commands and/or classes into computing code exported by export subsystem 704.

When the designer is finished defining the GUI screen design in the vector graphics design tool, the designer may provide input, such as a single selection of an export command, to initiate processing by export subsystem 704 to generate and export computing code, streamlined graphical elements, and/or optimized graphical elements for the GUI screen design. In response to the user input, export subsystem 704 may automatically perform one or more of the operations described herein to generate and export computing code, streamlined graphical elements, and/or optimized graphical elements for the GUI screen design. In some examples, no additional designer input is needed, and the export subsystem 704 automatically performs one or more of the operations described herein to generate and export computing code, streamlined graphical elements, and/or optimized graphical elements for the GUI screen design for access by a developer.

Export subsystem 704 may begin an exemplary export process by generating an overall reference screen of the GUI screen design. For example, export subsystem 704 may interface with the vector graphics design tool and instruct the tool to generate and export an overall reference screen for the GUI screen design. The overall reference screen may be exported in any suitable format, such as in a lossless or lossy bitmap format (e.g., as one or more Portable Network Graphics ("PNG") files). Export subsystem 704 may be configured to export data representative of the overall reference screen for distribution to a developer such that the developer may be able to use the overall reference screen as a reference if desired.

As part of the exemplary export process, export subsystem 704 may access and store information descriptive of or otherwise related to the GUI screen design. For example, export subsystem 704 may interface with the vector graphics design tool to determine and store data representative of screen dimensions within which the GUI screen design is to be displayed. For instance, export subsystem 704 may determine that GUI screen design is associated with screen dimensions of 1024×768 pixels, or any other screen dimensions. Export subsystem 704 may also interface with the vector graphics design tool to determine and store layer names and/or the order of the layers in the GUI screen design. In some examples, both the original layer names and the layer names without in-line commands (layer names with in-line commands removed) may be stored. Export subsystem 704 may be configured to interface with the vector graphics design tool to determine and store any other information about the GUI screen design.

Figure 11:
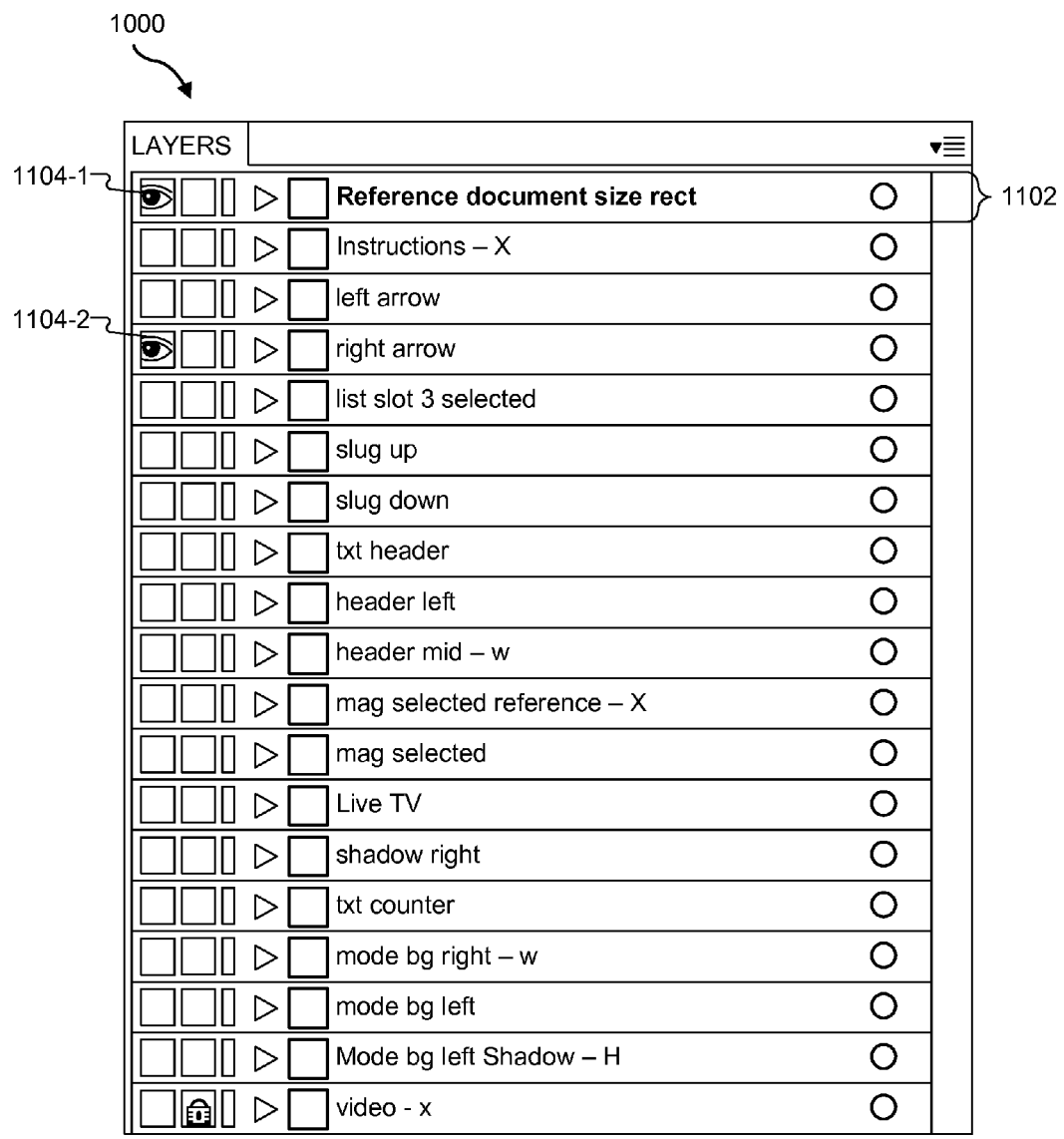
FIG. 11 illustrates a reference layer added to the list of layers shown in FIG. 10 according to principles described herein.

As part of the exemplary export process, export subsystem 704 may generate a reference graphical element having dimensions substantially equal to the determined screen dimensions associated with the GUI screen design. In certain examples, the reference graphical element may include a black rectangle having dimensions equal to the screen dimensions. Export subsystem 704 may interface with the vector graphics design tool to instruct the vector graphics design tool to generate the reference graphical element in a new layer. FIG. 11 illustrates a row 1102 representing a reference layer that corresponds to the reference rectangle and has been added to the list 1000 of layers included in the GUI screen design. As described herein, export subsystem 704 may be configured to utilize the reference graphics element to normalize graphics position data (e.g., by compensating for any differences in x-axis and/or y-axis positions and/or directions in the vector graphics design tool) and/or to remove extraneous pixel data.

As part of the exemplary export process, export subsystem 704 may process each layer individually. For example, export subsystem 704 may interface with the vector graphics design tool to step through the list 1000 of layers to individually process each layer in the list 1000. In some examples, export subsystem 704 may instruct the vector graphics design tool to turn off all layers in the list 1000 except for the individual layer to be processed and the newly added reference layer. FIG. 11 illustrates indicators 1104-1 and 1104-2 visually indicating that a reference layer (named "Reference document t size rect") and another particular layer (named "right arrow") are turned on for processing by export subsystem 704. All other layers in the list 1000 are turned off such that the "right arrow" layer may be processed individually with reference to the reference layer.

Export subsystem 704 may then process the individual layer in reference to the reference layer. The processing of the individual layer may include accessing and storing any vector graphics information about the individual layer or the graphical element corresponding to the individual layer. For example, if the individual layer includes text, export subsystem 704 may access and store vector-based text data associated with the text in the layer and/or in-line commands included in the name of the layer.

The processing of the turned-on individual layer with reference to the reference layer may further include rasterizing the individual layer and the reference layer from two vector-based images to a two-layer bitmap image. The rasterization may be performed in any suitable way. For example, export subsystem 704 may interface with the vector graphics design tool to instruct the vector graphics design tool to use native capabilities to rasterize the individual layer and the reference layer from two vector-based images to a two-layer bitmap image and to export the two-layer bitmap image. The exported bitmap image may be in any suitable bitmap format such as Adobe Photoshop data ("PSD") image format.

The exported bitmap image may include any data associated with the graphical element corresponding to the rasterized individual layer. For example, the bitmap image may include data specifying a position of the graphical element from a reference position (e.g., an offset from a reference position such as a top left coordinate of a screen).

As part of the exemplary export process, after bitmap images have been generated and exported for each layer in the list 1000 of layers, export subsystem 704 may remove the reference layer from the GUI screen design in the vector graphics design tool. For example, export subsystem 704 may instruct the vector graphics design tool to delete the reference layer from the GUI screen design. By doing this, export subsystem 704 causes the GUI screen design to be returned to the state of the GUI screen design before the export process began.

As part of the exemplary export process, export subsystem 704 may individually process each exported bitmap image to form a streamlined bitmap image. For example, for each exported bitmap image, export subsystem 704 may trim the image to the border of the reference graphical element. The trimming may include selecting a region and is equal to the dimensions of the reference graphical element (e.g., a reference rectangle having dimensions equal to screen dimensions) and removing extraneous data associated with pixels of the graphical element that are positioned outside of the region. The trimming may be performed in any suitable way, including by export subsystem 704 interfacing with a bitmap graphics design or editing tool and/or with a bitmap image trimming tool. After the image has been trimmed to the border of the region defined by the reference graphical element, the reference graphical element may be deactivated such as by removing the reference graphical element from the bitmap image or setting the reference graphical element to be invisible in the bitmap image.

For each exported bitmap image, export subsystem 704 may also trim the image to the bounds of the dimensions of the graphical element in the bitmap image. For example, the image may be trimmed by export subsystem 704 determining the dimensions of the actual graphical element within the bitmap image and removing extraneous data associated with pixels positioned outside of the bounds of the dimensions of the graphical element. The determining of the bounds of the graphical element and the trimming may be performed in any suitable way, including by export subsystem 704 interfacing with a bitmap graphics design or editing tool and/or with a bitmap image trimming tool.

In certain examples, the trimming described above may include removing extraneous data associated with one or more transparent pixels (e.g., fully transparent pixels) from the bitmap image. For example, a bitmap image may include transparent pixels surrounding the pixels of the actual graphical element. The transparent pixels may be used to determine the bounds of non-transparent pixels associated with the graphical element, and the extraneous data associated with the transparent pixels may be removed to further streamline the bitmap image.

In certain examples, export subsystem 704 may be configured to employ one or more safeguards to preserve transparent pixels that may be part of the graphical element. For example, export subsystem 704 may be configured to provide a buffer area for a graphical element that includes text or an icon. Data associated with pixels within the buffer area may be kept in the bitmap image, even if the pixels are transparent.

As mentioned above, export subsystem 704 may determine the bounds of the dimensions of an actual graphical element within a bitmap image. The bounds may be defined to encompass pixel data associated with the graphical element, which may typically be data associated with pixels that are not fully transparent. In certain implementations, the bounds may be defined as the top, left, right, and bottom boundaries of the graphical element. In certain implementations, the bounds may additionally or alternatively be defined by the height and width of the graphical element. Using the determined bounds, export subsystem 704 may store the bitmap images position data (e.g., coordinates, width, height, offset from reference position, and any other position data). This may contribute to the normalization of the position data of the graphical element described above.

As part of the exemplary export process, export subsystem 704 may be configured to further process the bitmap image based on any stored in-line commands associated with the graphical element layer represented by the bitmap image. For example, for a bitmap image, export subsystem 704 may determine, from data accessed and stored earlier in the export process, whether any in-line commands are associated with the bitmap image (e.g., whether any in-line commands were included in the original layer name associated with the bitmap image). If an in-line command is associated with the bitmap image, export subsystem 704 may further process the bitmap image based on the in-line command. Such processing may further streamline the bitmap image.

To illustrate, a bitmap image may represent a graphical element that, as indicated in the layer name of the layer corresponding to the graphical element, is to be stretched horizontally to expand the width of the graphical element when rendered. Based on this width-wise stretch command, export subsystem 704 may infer that a vertical slice of the graphical element may be used to represent the graphical element. Accordingly, export subsystem 704 may select a vertical slice of the graphical element and modify the bitmap image to represent only the vertical slice of the graphical element instead of the entire graphical element. The in-line command to horizontally stretch the bitmap image may be associated with the bitmap image such that export subsystem 704 may generate appropriate computing code to be executed by a target computing device to render the graphical element associated with the bitmap image.

As part of the exemplary export process, export subsystem 704 may save each streamlined bitmap image in a desired format (e.g., in PNG format). In certain examples, after all bitmap images for the GUI screen design have been saved, export subsystem 704 may name or rename each streamlined bitmap image to the layer name associated with the graphical element in the bitmap image without including any in-line commands in the name of the streamlined bitmap image.

As part of the exemplary export process, export subsystem 704 may generate abstraction data for the saved bitmap images associated with the GUI screen design. The abstraction data may be in any format that is suitable for use by export subsystem 704 to generate computing code based on the abstraction data, including any of the exemplary abstraction data formats described in co-pending U.S. patent application Ser. No. 12/983,109, entitled AUTOMATED GRAPHICAL USER INTERFACE DESIGN AND DEVELOPMENT SYSTEMS AND METHODS, and filed concurrently herewith, the contents of which are hereby incorporated by reference.

As part of the exemplary export process, export subsystem 704 may generate computing code configured to be processed by one or more target computing devices to render GUI screens in accordance with the GUI screen design. Export subsystem 704 may generate the computing code based on the abstraction data in any of the way described in the above-mentioned co-pending U.S. patent application Ser. No. 12/983,109, entitled AUTOMATED GRAPHICAL USER INTERFACE DESIGN AND DEVELOPMENT SYSTEMS AND METHODS, and filed concurrently herewith. The generated computing code may be saved by export subsystem 704 to any suitable data structure, including in one or more files such as text files or rich text format ("RTF") files.

As part of the exemplary export process, in certain implementations, export subsystem 704 may be further configured to optimize streamlined graphical elements (e.g., streamlined bitmap images) generated by export subsystem 704. For example, export subsystem 704 may queue up each streamlined graphical element to be subjected to any of the image data optimization systems and/or methods described herein.

As part of the exemplary export process, export subsystem 704 may be configured to export data representative of the generated computing code, streamlined bitmap images, and/or optimized bitmap images to distribution subsystem 706 for distribution to and access by a developer, as described above.

A developer may conveniently access and utilize data exported by export subsystem 704 to produce code that may be processed by one or more target devices to render GUI screens in accordance with a GUI screen design. For example, as mentioned above, a developer with access to data exported by export subsystem 704 may conveniently insert, or otherwise make reference to, exported computing code, such as by copying and pasting the computing code, into code being produced by the developer or into another appropriate location.

In certain examples, a developer may use exported computing code without making more than only minimal changes to the computing code. For example, the developer may be able to simply declare a root variable to indicate a path where exported graphical element files (e.g., streamlined and/or optimized bitmap image files) may be accessed. The path information may be provided to the developer by distribution subsystem 706 in any suitable way, including by email or other suitable communication.

In other examples, a developer may use exported computing code without making any changes to the computing code. For example, export subsystem 704 may automatically declare a value for a root variable to indicate a path where exported graphical element files (e.g., streamlined and/or optimized bitmap image files) may be accessed. To facilitate this capability, export subsystem 704 may be aware of where exported graphical element files are stored and may use the store path to determine and include the root path in the computing code. In addition, export subsystem 704 may store the exported graphical element files within data store having a directory structure that matches the directory structure of the data store used by the developer. As mentioned above, for example, distribution subsystem 706 may include a designer repository and a developer repository synchronized to include the same data as the designer repository. The matching directory structures may allow the path specified by a root variable in the exported computing code may be valid for both the repositories, including the developer repository used by the developer and access by the computing code.

Exported data may provide a developer with flexibility as to how graphical elements may be rendered. For example, exported data may include data that may be used to render text as text or as bitmap images of the text. Export subsystem 704 may be configured to automatically generate computing code configured to be processed to render text as text or as bitmap images of the text as dictated by a code generation heuristic.

In certain implementations, export subsystem 704 may be configured to present information descriptive of the operations and/or status of an export process. For example, during execution of an export process, information indicating which layers are active and being processed, graphical depictions of graphical images being trimmed, graphical depictions of computing code being generated, information indicating optimization rates (e.g., memory space savings), information indicating sizes of export files, information indicating elapsed processing time, and any other information descriptive of the operations and/or status of the export process may be presented to the designer. Export subsystem 704 may be configured to generate and present the information or interface with design subsystem 702 to instruct design subsystem 702 to present the information.

Export subsystem 704 may include or interface with any tools that may assist with the exemplary export operations described herein. For example, export subsystem 704 may include or interface with memory management tools (e.g., file managers, file read/write tools, Windows Explorer, etc.), text editors, file transfer services (e.g., a file server, web server, etc.), notification service (e.g., an email application), an image optimizer, and any other tool.

Figure 12:
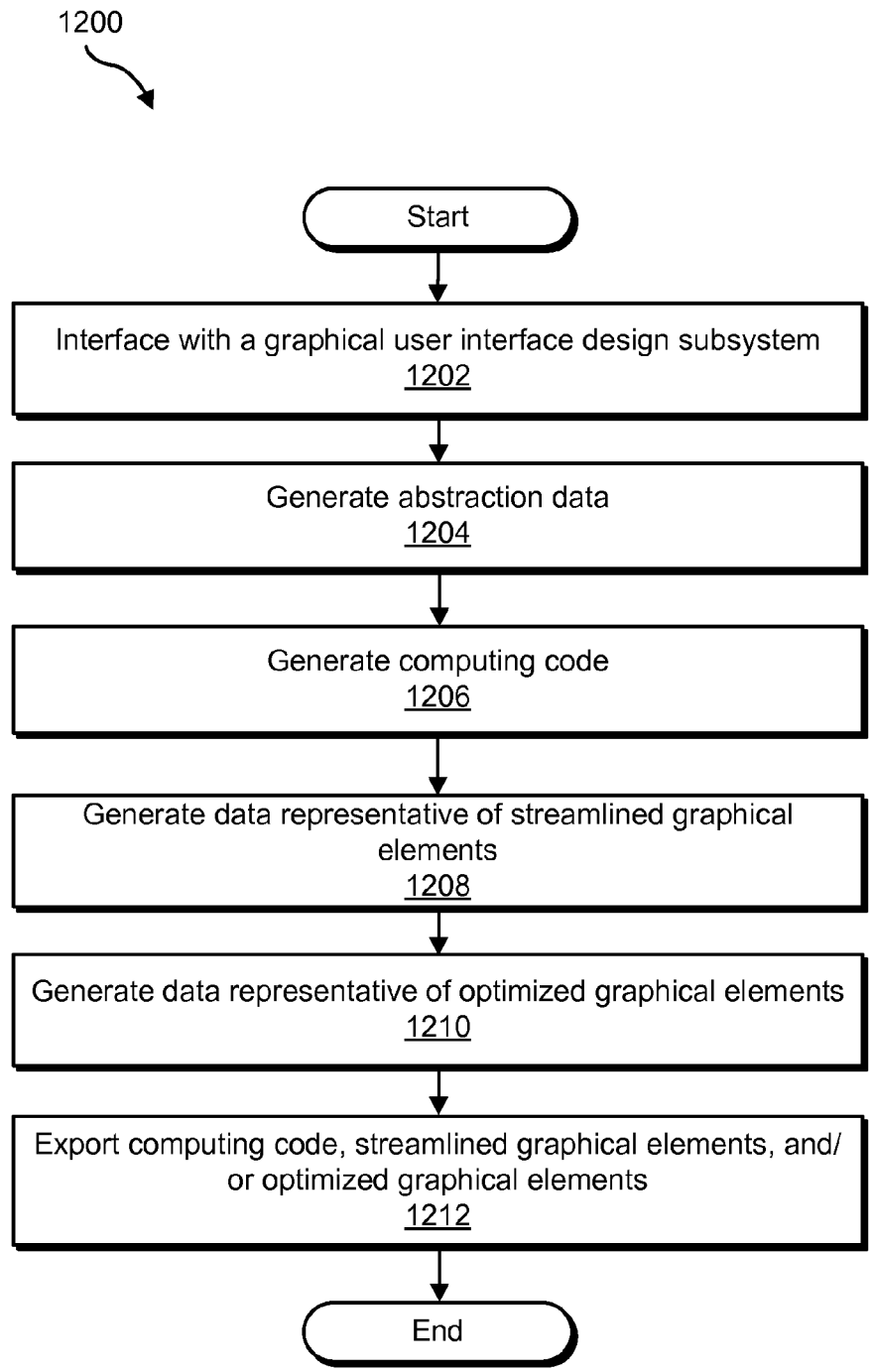
FIG. 12 illustrates an exemplary automated graphical user interface design and development process according to principles described herein.

FIG. 12 illustrates an exemplary automated GUI design and development process 1200. While FIG. 12 illustrates exemplary steps according to certain embodiments, other embodiments may omit, add to, reorder, combine, and/or modify any of the steps shown in FIG. 12. The steps shown in FIG. 12 may be performed by export subsystem 704 and/or any other component(s) of system 700.

In step 1202, export subsystem 704 may interface with a GUI design subsystem such as design subsystem 702. The interfacing may include accessing data representative of a GUI screen design and/or leveraging one or more capabilities of the GUI design subsystem, such as described herein.

In step 1204, export subsystem 704 may generate abstraction data. The abstraction data may be generated automatically based on data representative of the GUI screen design, such as described herein.

In step 1206, export subsystem 704 may generate computing code. In certain examples, the computing code may be automatically generated based on the abstraction data, such as described herein. As described above, in certain examples, export subsystem 704 may generate computing code configured to be processed by target computing devices having different computing platforms to render GUI screens in accordance with the GUI screen design.

In step 1208, export subsystem 704 may generate data representative of streamlined graphical elements. The streamlined graphical elements may be automatically generated based on data representative of one or more graphical elements included in the GUI screen design, such as described herein.

In step 1210, export subsystem 704 may generate data representative of optimized graphical elements. The optimized graphical elements may be automatically generated based on data representative of one or more graphical elements included in the GUI screen design and using any of the exemplary image data optimization systems and methods described herein.

In step 1212, export subsystem 704 may export computing code, one or more streamlined graphical elements, and/or one or more optimized graphical elements. The computing code, streamlined graphical elements, and/or one or more optimized graphical elements maybe exported to distribution subsystem 706 for access by a developer, such as described herein.

In certain embodiments, one or more of the components (e.g., control subsystem 104, export subsystem 704 and/or other components of system 100 and/or system 700) and/or processes described herein may be implemented and/or performed by one or more appropriately configured computing devices. To this end, one or more of the systems and/or components described above may include or be implemented by any computer hardware and/or computer-implemented instructions (e.g., software), or combinations of computer-implemented instructions and hardware, configured to perform one or more of the processes described herein. In particular, system components may be implemented on one physical computing device or may be implemented on more than one physical computing device. Accordingly, system components may include any number of computing devices, and may employ any of a number of computer operating systems.

One or more of the processes described herein may be implemented at least in part as instructions executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, flexible disk, hard disk, magnetic tape, any other magnetic medium, a CD-ROM, DVD, any other optical medium, a RAM, a PROM, an EPROM, a FLASH-EEPROM, any other memory chip or cartridge, or any other medium from which a computer can read.

Figure 13:
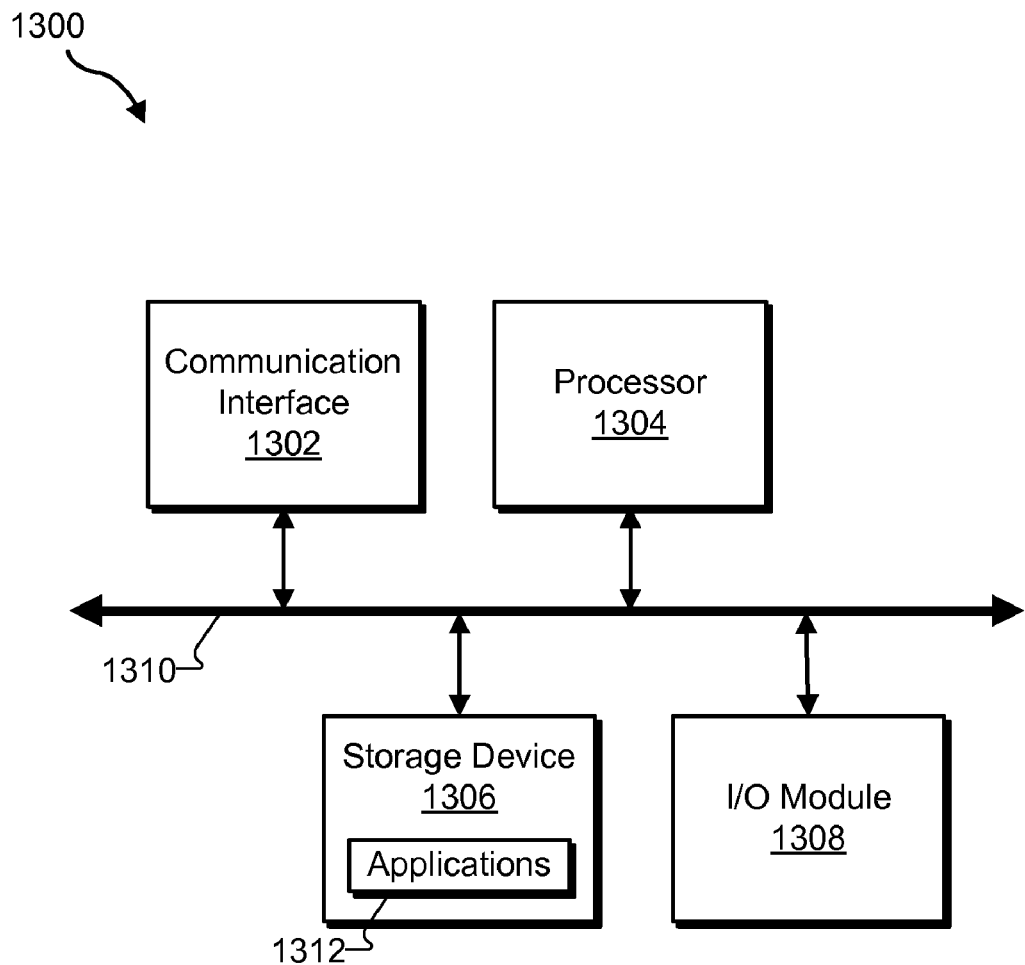
FIG. 13 illustrates an exemplary computing device according to principles described herein.

FIG. 13 illustrates an exemplary computing device 1300 configured to perform one or more of the processes described herein. In certain embodiments, computing device 1300 may implement control subsystem 104, export subsystem 704 and/or one or more other components of system 100 and/or system 700. As shown in FIG. 13, computing device 1300 may include a communication interface 1302, a processor 1304, a storage device 1306, and an input/output ("I/O") module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, random access memory ("RAM"), dynamic RAM ("DRAM"), other non-volatile and/or volatile data storage units, or a combination or sub-combination thereof. Electronic data, including data described herein, may be temporarily and/or permanently stored in storage device 1306. For example, data representative of one or more executable applications 1312 configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen, one or more output drivers (e.g., display drivers), one or more audio speakers, and one or more audio drivers. In certain embodiments, I/O module 1308 is configured to provide graphical data to a display for presentation to a user. The graphical data may be representative of one or more GUIs and/or any other graphical content as may serve a particular implementation.

In certain implementations, one or more facilities of control subsystem 104 and/or export subsystem 704 may be implemented by computing device 1300. For example, applications 1312 may be configured to direct processor 1304 to perform one or more operations of interface facility 302, control facility 304, interface facility 902, abstraction facility 904, and/or exporter facility 906. Additionally or alternatively, storage facility 306 and/or storage facility 908 may be implemented on storage device 1306.

While FIG. 13 illustrates components of a single computing device, in certain implementations, the image optimization systems and methods described herein may be implemented by multiple computing devices and may be configured to farm out optimization tasks (which tasks may include any operations associated with the optimization processes described herein) across several computing devices (e.g., several computing devices 1300, processors 1304, processor cores, network nodes, and/or other computing devices). Such farming out of optimization tasks may facilitate efficient optimization of large projects, including optimization of large, high resolution images, for example. Additionally or alternatively, such farming out may facilitate efficient batch optimization of a group of multiple images.

To illustrate, control subsystem 104 and optimization subsystem 102 may be implemented by multiple computing devices interconnected by a network. The network may comprise a server-client network, a peer-to-peer network, a local area network, a wide area network, or any other suitable network of combination of networks interconnecting the computing devices. In an exemplary implementation, one or more computing devices that are nodes in a network of computing devices may register with control subsystem 104, which may be implemented by a server device in the network. The computing devices may register to indicate to control subsystem 104 that the computing devices include resources (e.g., processors, processor cores, optimization tools, etc.) configured to perform image optimization processing, such as described herein.

The registered computing devices may be configured to communicate with control subsystem 104 to provide information about the resources of the computing devices, including, without limitation, the availability of resources, the currently running processes, and/or statistics such as success or failure of operations, processing times, network transmission times, etc. Based on this information, control subsystem 104 may selectively farm out optimization tasks to available resources, with tasks being sent to the most effective and available resources first. For example, based on the information provided by the computing devices, control subsystem 104 may determine effectiveness ratings of resources. The effectiveness ratings may then be used by control subsystem 104 to determine to which resources optimization tasks will be assigned. For example, the subjecting of data representative of an image to an image data optimization cycle may include control subsystem 104 selecting a optimization resource from a plurality of registered optimization resources based on optimization effectiveness ratings of the registered optimization resources and assigning one or more optimization tasks associated with the image data optimization cycle to the selected optimization resource for processing.

Control subsystem 104 may be configured to maintain data representative of information received from the computing devices and/or derived from the information received from the computing devices, including data representative of running optimization processes, statuses of the processes, effectiveness ratings of resources, and any other information received and/or derived from the computing devices. In certain examples, control subsystem 104 may be configured to maintain data representative of a measure of effectiveness of each registered resource. The effectiveness may be measured in any suitable way, including in terms of a measured speed of optimization of a known un-optimized image. The data representative of the effectiveness of optimization resources may be updated (e.g., by re-sampling the optimization resources with the known image) periodically based on a set frequency or schedule, or at any other suitable time. A sampling may include control subsystem 104 subjecting a known image to an optimization cycle to be performed by a particular optimization resource that is not under load. The time to complete the optimization may be measured and stored by control subsystem 104 for subsequent use in determining the relative effectiveness of the resource compared to other resources. The transmission time that is takes for the data representative of the image to travel from control subsystem 104 to the resource may also be measured and taken into account when determining the effectiveness rating of the resource.

Computing devices forming nodes of a network may communicate using any suitable data communication technologies. In certain implementations, for example, the nodal computing devices may communicate using any suitable web service protocol(s).

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:
    subjecting, by an image data optimization control subsystem, data representative of an image to an image data optimization cycle, the image data optimization cycle including
        submitting the data representative of the image as input to at least one image data optimization tool for optimization,
        receiving output data representative of the image from the at least one image data optimization tool, and
        determining whether the output data representative of the image is optimized by at least a predetermined optimization threshold compared to the data representative of the image submitted as input to the at least one image data optimization tool; and
    repeating, by the image data optimization control subsystem, the subjecting of data representative of the image to the image data optimization cycle in response to a determination that the output data representative of the image is optimized by at least the predetermined optimization threshold, wherein the repeat subjection of data representative of the image includes submitting the output data received from the image data optimization tool in conjunction with the previous subjection as new input to the at least one image data optimization tool.

2. The method of claim 1, wherein the subjecting of data representative of the image to the image data optimization cycle comprises the image data optimization control subsystem interfacing with the at least one image data optimization tool to perform the submitting of the data representative of the image as input to the at least one image data optimization tool and the receiving of the output data representative of the image from the at least one image data optimization tool.

3. The method of claim 1, wherein the predetermined optimization threshold comprises any reduction in bit count of the output data representative of the image compared to the data representative of the image subjected to the image data optimization cycle.

4. The method of claim 1, wherein the optimization is lossless.

5. The method of claim 1, wherein the at least one image data optimization tool includes a plurality of image data optimization tools each configured to independently optimize the data representative of the image and generate an output data instance representative of the image.

6. The method of claim 5, wherein the subjecting of data representative of the image to the image data optimization cycle comprises:
    determining which of the output data instances representative of the image generated by the plurality of image optimization tools is most optimized; and
    selecting the most-optimized output data instance representative of the image as the output data representative of the image.

7. The method of claim 6, wherein the most-optimized output data instance representative of the image has a largest reduction in bit count compared to the other output data instances representative of the image.

8. The method of claim 1, further comprising outputting, by the image data optimization control subsystem, the output data representative of the image as optimized data representative of the image in response to a determination that the output data representative of the image is not optimized by at least the predetermined optimization threshold.

9. The method of claim 1, wherein the method is performed by the image data optimization control subsystem as part of an automated graphical user interface design and development process, the method further comprising:
    receiving, by the image data optimization control subsystem, the data representative of the image from the automated graphical user interface design and development process; and outputting, by the image data optimization control subsystem, the output data representative of the image as optimized data representative of the image to the automated graphical user interface design and development process in response to a determination that the output data representative of the image generated by the at least one image data optimization tool is not optimized by at least the predetermined threshold.

10. The method of claim 1, wherein the data representative of the image comprises a bitmap graphics file.

11. The method of claim 1, wherein the subjecting of the data representative of the image to the image data optimization cycle further comprises:
selecting a optimization resource from a plurality of registered optimization resources based on optimization effectiveness ratings of the registered optimization resources, and
assigning one or more optimization tasks associated with the image data optimization cycle to the selected optimization resource for processing.

12. The method of claim 1, embodied as computer-executable instructions on at least one non-transitory computer-readable medium.

13. A method comprising:
submitting, by an image data optimization control subsystem, an image data file as input to a plurality of image data optimization tools for optimization;
receiving, by the image data optimization control subsystem in response to the submitting of the image data file as input to the plurality of image data optimization tools, a plurality of output image data files from the plurality of image data optimization tools;
selecting, by the image data optimization control subsystem from the plurality of output image data files, an output image data file having a greatest reduction in bit count compared to the other output image data files in the plurality of output image data files;
determining, by the image data optimization control subsystem, that the selected output image data file is optimized by at least a predetermined optimization threshold compared to the image data file submitted as input to the plurality of image data optimization tools; and
submitting, by the image data optimization control subsystem, the selected output image data file as new input to the plurality of image data optimization tools for optimization in response to the determination that the selected output image data file is optimized by at least the predetermined optimization threshold.

14. The method of claim 13, further comprising:
receiving, by the image data optimization control subsystem in response to the submitting of the selected output image data file as new input to the plurality of image data optimization tools, a plurality of additional output image data files from the plurality of image data optimization tools;
selecting, by the image data optimization control subsystem from the plurality of additional output image data files, an additional output image data file having a greatest reduction in bit count compared to the other additional output image data files in the plurality of additional output image data files;
determining, by the image data optimization control subsystem, that the additional output image data file is not optimized by at least the predetermined optimization threshold compared to the output image data file submitted as new input to the plurality of image data optimization tools; and outputting, by the image data optimization control subsystem, the additional output image data file as a final optimized image data file in response to the determination that the additional output image data file is not optimized by at least the predetermined optimization threshold.

15. The method of claim 14, wherein:
the method is performed by the image data optimization control subsystem as part of an automated graphical user interface design and development process;
the method further comprises receiving, by the image data optimization control subsystem, the data representative of the image from the automated graphical user interface design and development process; and
the outputting of the additional output image data file as the final optimized image data file comprises outputting the final optimized image data file to the automated graphical user interface design and development process.

16. The method of claim 13, embodied as computer-executable instructions on at least one non-transitory computer-readable medium.

17. A method comprising:
repeatedly subjecting, by an image data optimization control subsystem, data representative of an image to an image data optimization cycle for optimization by at least one image data optimization tool until output data representative of the image provided by the at least one image optimization tool fails to be optimized by at least a predetermined threshold;
wherein the repeated subjection includes an initial subjection and one or more subsequent subjections of image data representative of the image to the image data optimization cycle;
wherein the initial subjection to the image data optimization cycle includes submitting, by the image data optimization control subsystem, initial image data representative the image to the at least one image data optimization tool for optimization; and
wherein each of the one or more subsequent subjections to the image data optimization cycle includes submitting, by the image data optimization control subsystem, output data provided by the at least one image optimization tool in conjunction with the previous subjection to the image data optimization cycle as new input to the at least one image data optimization tool for optimization.

18. The method of claim 17, embodied as computer-executable instructions on at least one non-transitory computer-readable medium.

19. A system comprising:
an interface facility configured to interface with at least one image data optimization tool; and
an image data optimization control facility communicatively coupled to the interface facility and configured to subject data representative of an image to an image data optimization cycle, the image data optimization cycle including
submitting, by way of the interface facility, the data representative of the image as input to the at least one image data optimization tool for optimization,
receiving, by way of the interface facility, output data representative of the image from the at least one image data optimization tool, and
determining whether the output data representative of the image is optimized by at least a predetermined optimization threshold compared to the data representative of the image submitted as input to the image data optimization tool, and repeat the subjection of data representative of the image to the image data optimization cycle in response to a determination that the output data representative of the image is optimized by at least the predetermined optimization threshold, wherein the repeat subjection of data representative of the image includes submitting the output data received from the image data optimization tool in conjunction with the previous subjection as new input to the at least one image data optimization tool.

20. The system of claim 19, wherein the predetermined optimization threshold comprises any reduction in bit count of the output data representative of the image compared to the data representative of the image subjected to the image data optimization cycle.

21. The system of claim 19, wherein the at least one image data optimization tool includes a plurality of image data optimization tools each configured to independently optimize the data representative of the image and generate an output data instance representative of the image.

22. The system of claim 21, wherein the repeat subjection of data representative of the image to the image data optimization cycle comprises:

determining which of the output data instances representative of the image generated by the plurality of image optimization tools is most optimized; and
  selecting the most-optimized output data instance representative of the image data as the output data representative of the image.

23. The system of claim 22, wherein the most-optimized output data instance representative of the image has a largest reduction in bit count compared to the other output data instances representative of the image.

24. The system of claim 19, wherein the interface facility is configured to
  receive the data representative of the image from an automated graphical user interface design and development process, and
  output the output data representative of the image as optimized data representative of the image to the automated graphical user interface design and development process in response to a determination that the output data representative of the image generated by the image optimization subsystem is not optimized by at least the predetermined threshold.

* * * * *